United States Patent
Kumazaki et al.

(10) Patent No.: US 8,308,593 B2
(45) Date of Patent: Nov. 13, 2012

(54) HYBRID VEHICLE DRIVE SYSTEM

(75) Inventors: Kenta Kumazaki, Toyota (JP); Tooru Matsubara, Toyota (JP); Atsushi Tabata, Okazaki (JP); Keita Imai, Toyota (JP); Masakazu Kaifuku, Okazaki (JP); Masaki Yoshida, Okazaki (JP); Tatsuya Imamura, Okazaki (JP); Yuji Iwase, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1009 days.

(21) Appl. No.: 12/230,765

(22) Filed: Sep. 4, 2008

(65) Prior Publication Data

US 2009/0093330 A1   Apr. 9, 2009

(30) Foreign Application Priority Data

Oct. 9, 2007   (JP) ................................. 2007-262926

(51) Int. Cl.
*B60K 17/04*   (2006.01)

(52) U.S. Cl. .......................................................... 475/5

(58) Field of Classification Search ........................ 475/5
See application file for complete search history.

(56) References Cited

U.S. PATENT DOCUMENTS

| | | | | |
|---|---|---|---|---|
| 5,730,675 A * | 3/1998 | Yamaguchi | ........................ | 475/2 |
| 7,273,435 B2 * | 9/2007 | Raghavan et al. | ............ | 475/151 |
| 7,935,015 B2 | 5/2011 | Tabata et al. | | |
| 2006/0229153 A1 * | 10/2006 | Bucknor et al. | ................... | 475/5 |
| 2010/0029429 A1 * | 2/2010 | Ota | .................................. | 475/5 |

FOREIGN PATENT DOCUMENTS

| | | |
|---|---|---|
| JP | A-2000-197208 | 7/2000 |
| JP | A-2005-112019 | 4/2005 |
| JP | A-2005-297786 | 10/2005 |
| JP | A-2006-283917 | 10/2006 |
| JP | A-2007-001492 | 1/2007 |

OTHER PUBLICATIONS

May 15, 2012 Office Action issued in Japanese Patent Application No. 2007-262926 (with partial translation).

* cited by examiner

*Primary Examiner* — Sherry Estremsky
(74) *Attorney, Agent, or Firm* — Oliff & Berridge, PLC

(57) ABSTRACT

A drive system of a hybrid vehicle, including an engine, a first electric motor, a second electric motor operatively connected to a drive wheel of the hybrid vehicle, and two planetary gear mechanisms, and wherein the two planetary gear mechanisms have at least four rotary elements arranged to permit the drive system to be placed in a selected one of a first operation mode in which the rotary element connected to the engine and the rotary element connected to the first electric motor are disposed on opposite sides of the rotary element connected to the drive wheel and the second electric motor, as seen in a collinear chart in which the four rotary elements are located at respective four different positions along a base line, and a second operation mode in which the rotary element connected to the first electric motor and the rotary element connected to the drive wheel and the second electric motor are disposed on opposite sides of the rotary element connected to the engine, as seen in said collinear chart.

13 Claims, 11 Drawing Sheets

|  | CL1 | CL2 |
|---|---|---|
| Lo (Electric torque-converter mode) | ○ |  |
| Hi |  | ○ |
| R (motor) Lo | ○ |  |
| R (motor) Hi |  | ○ |
| N |  |  |

○ : ENGAGED

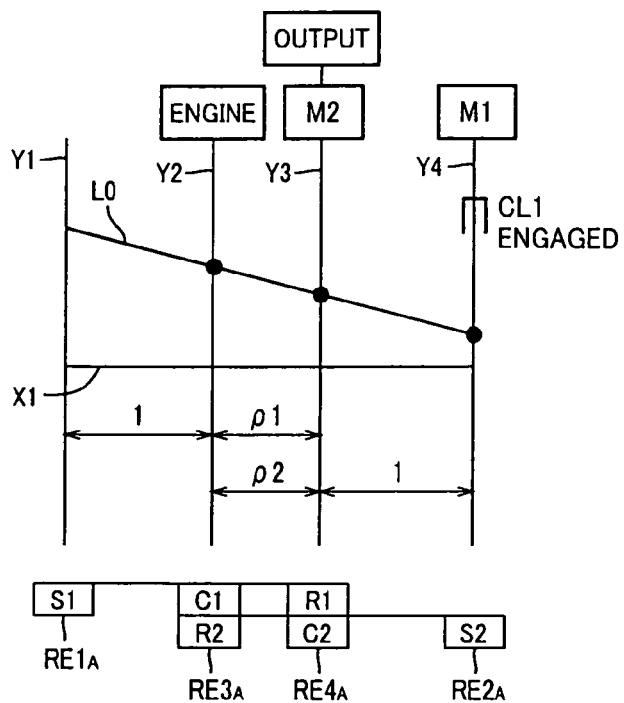
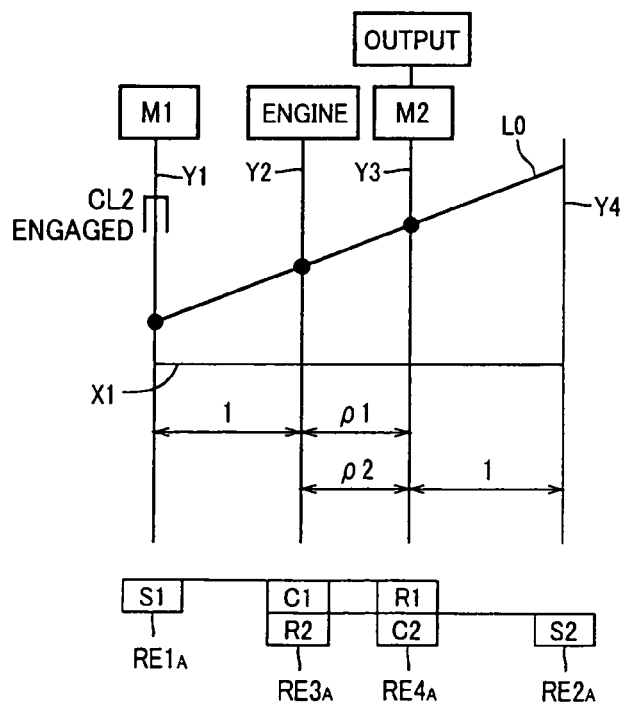

|  | CL1 | CL2 |
|---|---|---|
| Lo (Electric torque-converter mode) | ○ | |
| Hi | | ○ |
| R(motor) Lo | ○ | |
| R(motor) Hi | | ○ |
| N | | |

○ : ENGAGED

HYBRID VEHICLE DRIVE SYSTEM

The present application claims priority from Japanese Patent Application No. 2007-262926 filed on Oct. 9, 2007, the disclosure of which is herein incorporated by reference in its entirety.

BACKGROUND OF THE INVENTION

1. Field of the Invention

The present invention relates in general to a drive system of a hybrid vehicle, and more particularly to techniques for improving fuel economy of a hybrid vehicle drive system

2. Discussion of Prior Art

JP-2000-197208A discloses a drive system of a hybrid vehicle, which includes an engine, a first electric motor, a second electric motor, and a planetary gear mechanism having three rotary elements. The planetary gear mechanism has a first rotary element in the form of a carrier connected to the engine, a second rotary element in the form of a sun gear connected to the first electric motor, and a third rotary element in the form of a ring ear connected to the second electric motor and drive wheels of the hybrid vehicle. A major portion of the engine output is mechanically transmitted through the planetary gear mechanism to the drive wheels, while a portion of the engine output is converted into an electric energy by the first electric motor operable as an electric generator. This electric energy is supplied through an inverter to the second electric motor to operate the second electric motor for rotating the drive wheels. The electric energy may be stored in an electric-energy storage device through the inverter, and the electric energy stored in the electric-energy storage device can be supplied to the first electric motor M1 through the inverter, to operate the first electric motor for rotating the drive wheels. The speed ratio of the planetary gear mechanism (ratio of the rotating speed of the first rotary element to the rotating speed of the third rotary element) is continuously variable when the operating state of the first electric motor is controlled.

The hybrid vehicle drive system disclosed in the above-identified publication JP-2000-197208A has a power transmitting path consisting of a mechanical path through which the output of the engine is mechanically transmitted through the planetary gear mechanism to the drive wheels, and an electric path through which the electric energy generated by the first electric motor operated by a portion of the engine output is supplied to the second electric motor or back to the first electric motor, to convert the electric energy into a mechanical energy for rotating the drive wheels. The power transmitting efficiency of the mechanical path does not change considerably even when the speed ratio of the planetary gear mechanism changes. In this drive system, the operating speed of the engine can be controlled owing to the differential function of the planetary gear mechanism, so as to maximize the fuel economy of the engine, without an influence by the running speed of the hybrid vehicle. Accordingly, the fuel economy of the hybrid vehicle can be improved owing to the power transmitting efficiency of the electric path that can be held at a high value in spite of a change of the speed ratio of the planetary gear mechanism. In the hybrid vehicle drive system in question, however, the connections of the engine, first electric motor and drive wheels to the rotary elements of the planetary gear mechanism in the form of the carrier, sun gear and ring gear cannot be changed, so that the relationship between the power transmitting efficiency of the electric path and the change of the speed ratio of the planetary gear mechanism cannot be changed considerably, whereby it is not possible to maintain a high degree of efficiency of power transmission from the engine to the drive wheels, over a wide range of change of the speed ratio of the planetary gear mechanism.

SUMMARY OF THE INVENTION

The present invention was made in view of the background art described above. It is therefore an object of this invention to provide a drive system of a hybrid vehicle, which makes it possible to maintain a high degree of overall power transmitting efficiency of the hybrid drive system including the power transmitting efficiency of the electric path, for thereby permitting an improvement of fuel economy of the hybrid vehicle.

The object indicated above can be achieved according to any one of the following modes of this invention, each of which is numbered like appended claims and depends from the other mode or modes, where appropriate, for easier understanding of technical features disclosed in the present application, and possible combinations of those technical features.

(1) A drive system of a hybrid vehicle, including an engine, a first electric motor, a second electric motor operatively connected to a drive wheel of the hybrid vehicle, and two planetary gear mechanism, wherein the two planetary gear mechanisms have at least four rotary elements arranged to permit the drive system to be placed in a selected one of a first operation mode in which the rotary element connected to the engine and the rotary element connected to the first electric motor are disposed on opposite sides of the rotary element connected to the drive wheel and the second electric motor, as seen in a collinear chart in which the four rotary elements are located at respective four different positions along a base line, and a second operation mode in which the rotary element connected to the first electric motor and the rotary element connected to the drive wheel and the second electric motor are disposed on opposite sides of the rotary element connected to the engine, as seen in the collinear chart.

In the drive system constructed according to the above-described mode (1) of the present invention, the four rotary elements of the two planetary gear mechanisms are arranged to permit the drive system to be placed in the selected one of the first and second operation modes. In the first operation mode, the rotary element connected to the engine and the rotary element connected to the first electric motor are disposed on opposite sides of the rotary element connected to the drive wheel and the second electric motor, as seen in the collinear chart in which the four rotary elements are located at the respective four different positions along the base line of the collinear chart. In the second operation mode, the rotary element connected to the first electric motor and the rotary element connected to the drive wheel and the second electric motor are disposed on the opposite sides of the rotary element connected to the engine, as seen in the above-indicated collinear chart. The relative rotating speeds of the engine, first electric motor and drive wheel in the first operation mode are different from those in the second operation mode, so that a relationship between a speed ratio and power transmitting efficiency of the drive system in the first operation mode is different from that in the second operation mode. Accordingly, the power transmitting efficiency of the drive system can be held high enough to assure a high degree of fuel economy of the hybrid vehicle, over a wide range of the overall speed ratio of the drive system, by suitably switching the drive system between its first and second operation modes. In both of the first and second operation modes, the second electric motor is connected to the rotary element to which the drive wheel is connected. Namely, the rotary element to which the second electric motor and the drive wheel are connected is not changed when the operation mode of the drive system is changed, so that the drive system can be smoothly switched between the first and second operation modes.

(2) The drive system according to the above-described mode (1), wherein the at least four rotary elements of the two planetary gear mechanisms are arranged such that the rotary element connected to the drive wheel and the second electric motor is rotated at a speed intermediate between a rotating speed of the rotary element connected to the engine and a rotating speed of the rotary element connected to the first electric motor, in the first operation mode, and the rotary element connected to the engine is rotated at a speed intermediate between the rotating speed of the rotary element connected to the first electric motor and a rotating speed of the rotary element connected to the drive wheel and the second electric motor, in the second operation mode.

In the drive system according to the above-described mode (2) of the invention, the power transmitting efficiency of the drive system can be held high enough to assure a high degree of fuel economy of the hybrid vehicle, over a wide range of the overall speed ratio of the drive system, by suitably switching the drive system between its first and second operation modes. In both of the first and second operation modes, the second electric motor is connected to the rotary element to which the drive wheel is connected. Namely, the rotary element to which the second electric motor and the drive wheel are connected is not changed when the operation mode of the drive system is changed, so that the drive system can be smoothly switched between the first and second operation modes.

(3) The drive system according to the above-described mode (1) or (2), wherein the second electric motor is connected directly to a power transmitting path between the drive wheel and the two planetary gear mechanisms.

In the above-described mode (3) of the invention, the connection of the second electric motor to the power transmitting path between the drive wheel and the two planetary gear mechanisms is maintained irrespective of the switching of the operation mode of the drive system, so that the operation mode can be smoothly switched between the first and second operation modes.

(4) The drive system according to any one of the above-described modes (1)-(3), wherein the rotary element connected to the engine and the rotary element connected to the drive wheel and the second electric motor are disposed adjacent to each other, while the other two rotary elements are disposed as a first rotary element a second rotary element, respectively, on respective opposite sides of the two rotary elements disposed adjacent to each other, as seen in the above-indicated collinear chart, and wherein the first electric motor is connected to a selected one of the first and second rotary elements, to place the drive system in the selected one of the first and second operation modes.

In the above-described mode (4) of this invention wherein the first electric motor is connected to a selected one of the first and second rotary elements, the power transmitting efficiency of the drive system can be held high enough to assure a high degree of fuel economy of the hybrid vehicle, over a wide range of the speed ratio of the drive system.

(5) The drive system according to the above-described modes (4), wherein the two planetary gear mechanisms includes the first and second rotary elements connectable to the first electric motor, a third rotary element connected to the engine, and a fourth rotary element connected to the drive wheel and the second electric motor, and wherein when the first, second, third and fourth rotary elements have respective different rotating speeds, these different rotating speed decrease in the order of the first, third, fourth and second rotary elements, or in the reverse order, the first electric motor being connected to the second rotary element to establish the first operation mode, and to the first rotary element to establish the second operation mode.

In the above-described mode (5) of the invention wherein the operation mode is changed by connecting the first electric motor selectively to one of the first and second rotary elements, the power transmitting efficiency of the drive system can be held high enough to assure a high degree of fuel economy of the hybrid vehicle, over a wide range of the speed ratio of the drive system.

(6) The drive system according to the above-described mode (4) or (5), which is switched between the first and second operation modes under a synchronous mode switching control implemented so as to minimize a difference between operating speeds of the first electric motor before and after switching of the drive system between the first and second operation modes.

In the above-described mode (6) of the present invention wherein the difference between the operating speeds of the first electric motor before and after the switching of the drive system between the first and second operation modes is minimized under the synchronous mode switching control, a shock generated upon switching of the drive system between the first and second operation modes can be effectively reduced.

(7) The drive system according to any one of the above-described modes (4)-(6), wherein the synchronous mode switching control is implemented such that a direction of an output torque of the first electric motor after the switching of the drive system between the first and second operation modes is reversed with respect to that before the switching of the drive system between the first and second operation modes.

Where the engine is operated at a constant speed, the direction of change of the rotating direction of the rotary element connected to the drive wheel and second electric motor due to a change of the operating direction of the first electric motor after the switching of the drive system between the first and second operation modes is reversed with respect to that before the switching. In the above-described mode (7) of the invention, the synchronous mode switching control is implemented such that the direction of the output torque of the first electric motor after the switching of the drive system between the two operation modes is reversed with respect to that before the switching, so that the shock generated upon switching of the drive system between the first and second operation modes can be effectively reduced.

(8) The drive system according to any one of the above-described modes (4)-(7), wherein the first rotary element is a sun gear of one of the two planetary gear mechanisms, and the second rotary element is a sun gear of the other of the two planetary gear mechanisms, the rotary element connected to the engine consisting of a carrier of the above-indicated one planetary gear mechanism and a ring gear of the above-indicated other planetary gear mechanism, which carrier and ring gear are fixed to each other, and the rotary element connected to the drive wheel and the second electric motor consisting of a ring gear of the above-indicated one planetary gear mechanism and a carrier of the above-indicated other planetary gear mechanism, which ring gear and carrier are fixed to each other.

In the above-described mode (8) of this invention wherein the first electric motor is selectively connected to one of the sun gears of the two planetary gear mechanisms, the power transmitting efficiency of the drive system can be held high enough to assure a high degree of fuel economy of the hybrid vehicle, over a wide range of the speed ratio of the drive system.

(9) The drive system according to any one of the above-described modes (1)-(3), wherein the at least four rotary elements includes a first rotary element and a second rotary element which are disposed on respective opposite sides of the rotary element connected to the drive wheel and the second electric motor, as seen in the above-indicated collinear chart, and the rotary element connected to the first electric motor is disposed on one side of the first rotary element remote from the rotary element connected to the drive wheel and the second electric motor, as seen in the collinear chart, and wherein the engine is connected to a selected one of the first and second rotary elements, to place the drive system in the selected one of the first and second operation modes.

In the above-described mode (9) of the invention wherein the engine is connected to a selected one of the first and second rotary elements, the power transmitting efficiency of the drive system can be held high enough to assure a high degree of fuel economy of the hybrid vehicle, over a wide range of the speed ratio of the drive system.

(10) The drive system according to the above-described mode (9), wherein the two planetary gear mechanisms includes the first and second rotary elements connectable to the engine, a third rotary element connected to the first electric motor, and a fourth rotary element connected to the drive wheel and the second electric motor, and wherein when the first, second, third and fourth rotary elements have respective different rotating speeds, the different rotating speeds decrease in the order of the third, first, fourth and second rotary elements, or in the reverse order, the engine being connected to the second rotary element to establish the first operation mode, and to the first rotary element to establish the second operation mode.

In the above-described mode (10 of the invention wherein the operation mode is changed by connecting the engine selectively to one of the first and second rotary elements, the power transmitting efficiency of the drive system can be held high enough to assure a high degree of fuel economy of the hybrid vehicle, over a wide range of the speed ratio of the drive system.

(11) The drive system according to the above-described mode (9) or (10), which is switched between the first and second operation modes under a synchronous mode switching control implemented so as to minimize a difference between operating speeds of the engine before and after switching of the drive system between the first and second operation modes.

In the above-described mode (11) of the invention wherein the difference between the operating speeds of the engine before and after the switching of the drive system between the first and second operation modes is minimized under the synchronous mode switching control, a shock generated upon switching of the drive system between the first and second operation modes can be effectively reduced.

(12) The drive system according to any one of the above-described modes (9)-(11), wherein the first rotary element consists of a carrier of one of the two planetary gear mechanisms and a ring gear of the other of the two planetary gear mechanisms, which carrier and ring gear are fixed to each other, and the second rotary element is a sun gear of the other of the two planetary gear mechanisms, the rotary element connected to the first electric motor being a sun gear of the one planetary gear mechanism, and the rotary element connected to the drive wheel and the second electric motor consisting of a ring gear of the one planetary gear mechanism and a carrier of the other planetary gear mechanism, which ring gear and carrier are fixed to each other.

In the above-described mode (12) of the invention wherein the engine is selectively connected to the first rotary element (consisting of the carrier of one of the two planetary gear mechanisms and the ring gear of the other planetary gear mechanism) or to the second rotary element (the sun gear of the above-indicated other planetary gear mechanism), the power transmitting efficiency of the drive system can be held high enough to assure a high degree of fuel economy of the hybrid vehicle, over a wide range of the speed ratio of the drive system.

(13) The drive system according to any one of the above-described modes (1)-(12), further including a transmission disposed between one of the engine and the drive wheel, and the two planetary gear mechanisms.

In the above-described mode (13) of the invention wherein the transmission is disposed between the engine or the drive wheel and the two planetary gear mechanisms, the power transmitting efficiency of the drive system can be held high enough to assure a high degree of fuel economy of the hybrid vehicle, over a wider range of the speed ratio of the drive system.

(14) The drive system according to any one of the above-described modes (1)-(13), further comprising a differential-limiting device operable to fix one of the rotary elements of the two planetary gear mechanisms to another of the rotary elements or a stationary member.

In the above described mode (14) of the invention wherein the differential-limiting device is provided, the two planetary gear mechanisms can be disabled by the differential-limiting device, to permit the output of the engine to be transmitted to the drive wheel, without the planetary gear mechanisms distributing the engine output to the first electric motor as well as to the drive wheel.

BRIEF DESCRIPTION OF THE DRAWINGS

The above and other objects, features, advantages and technical and industrial significance of this invention will be better understood by reading the following detailed description of preferred embodiments of the invention, when considered in connection with the following drawings, in which:

FIG. 3 is a collinear chart having four straight lines on which are indicated relative rotating speeds of four rotary elements of the power distributing mechanism, when the hybrid vehicle drive system of FIG. 1 is placed in a Lo mode (first operation mode);

FIG. 4 is a collinear chart having four straight lines on which are indicated relative the rotating speeds of the four rotary elements of the power distributing mechanism when the hybrid vehicle drive system of FIG. 1 is placed in a Hi mode (second operation mode);

DETAILED DESCRIPTION OF PREFERRED EMBODIMENT

First Embodiment

Figures 1, 2:
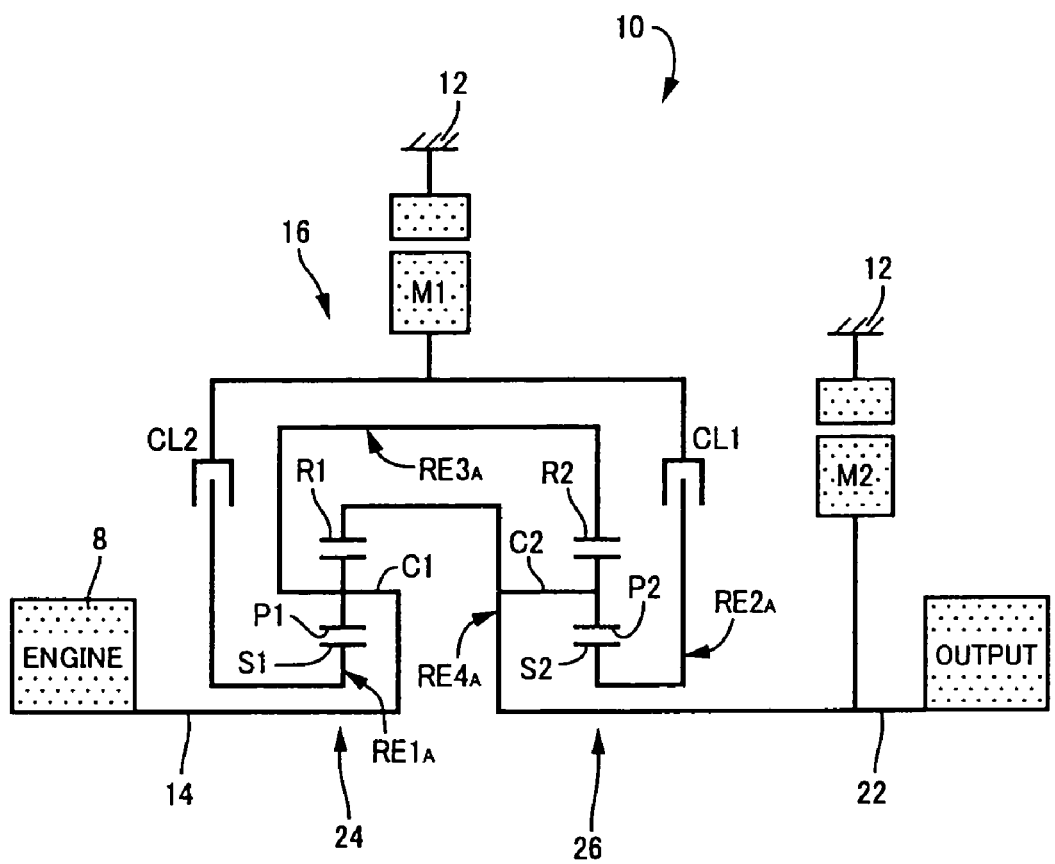
FIG. 1 is a schematic view showing an arrangement of a hybrid vehicle drive constructed according to a first embodiment of the present invention.
FIG. 2 is a table indicating operation modes of the hybrid vehicle drive system of FIG. 1 in relation to operating states of hydraulically operated frictional coupling devices incorporated in a power distributing mechanism of the drive system.
Figure 7:
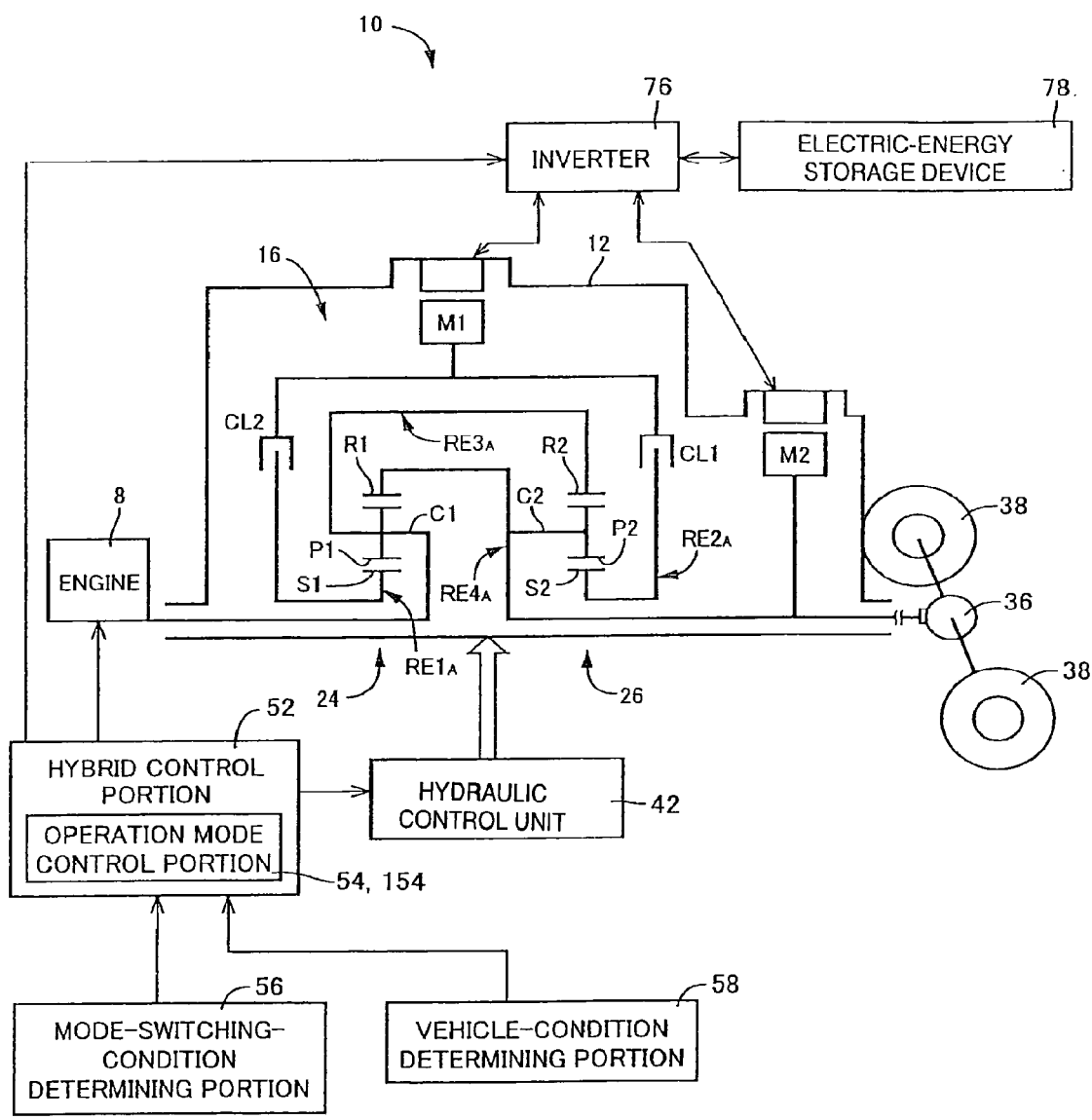
FIG. 7 is a functional block diagram illustrating major control functions of the electronic control device of FIG. 5.

Referring to the schematic view of FIG. 1, there is shown a drive system 10 of a hybrid vehicle, which is constructed according to the first embodiment of the present invention. As shown in FIG. 1, the drive system 10 includes: an engine 8; an input rotary member in the form of an input shaft 14 connected to the engine 8 either directly or indirectly via a pulsation absorbing damper (vibration damping device) not shown, to receive an output of the engine 8; a differential mechanism in the form of a power distributing mechanism 16 connected to the input shaft 14; and an output rotary member in the form of an output shaft 22 connected to the power distributing mechanism 16. The input shaft 12, power distributing mechanism 16 and output shaft 22 are coaxially disposed on a common axis within a stationary member in the form of a transmission casing 12 (hereinafter referred to as "casing 12") attached to a body of the hybrid vehicle, and are connected in series with each other. The engine 8 may be an internal combustion engine such as a gasoline engine or diesel engine and functions as a vehicle drive power source. The drive system 10 is configured to transmit a vehicle drive force to a pair of drive wheels 38 through a differential gear device 36 (final speed reduction gear) and a pair of drive axles, as shown in FIG. 7. It is noted that a lower half of the drive system 10, which is constructed symmetrically with respect to its axis, is omitted in FIG. 1.

The power distributing mechanism 16 is provided with a first electric motor M1, and functions as a differential mechanism operable to mechanically distribute an output of the engine 8 received through the input shaft 14, to the first electric motor M1 and the output shaft 22, and also operable to synthesize the output of the engine 8 and an output of the first electric motor M1, so that the sum of these outputs is transmitted to the output shaft 22. A second electric motor M2 is connected to the output shaft 22, so that a drive shaft of the second electric motor M2 and the output shaft 22 are rotated as a unit. In other words, the second electric motor M2 is connected directly to a power transmitting path between the power distributing mechanism 16 and the drive wheels 38. Each of the first electric motor M1 and the second electric motor M2 is a so-called motor/generator operable also as an electric generator. However, the first electric motor M1 may have only a function of an electric generator capable of generating a reaction force, while the second electric motor M2 may have only a function of an electric motor capable of generating a vehicle drive force.

The power distributing mechanism 16 includes a first planetary gear set 24 of a single-pinion type having a gear ratio $\rho 1$ of about 0.3, for example, a second planetary gear set 26 of a single-pinion type having a gear ratio $\rho 2$ of about 0.3, for example, a first clutch CL1 and a second clutch CL2. Namely, the power distributing mechanism 16 consists of the two planetary gear mechanisms 24, 26 and the two clutches CL1, CL2. The first planetary gear set 24 has rotary elements consisting of: a first sun gear S1; a first planetary gear P1; a first carrier C1 supporting the first planetary gear P1 such that the first planetary gear P1 is rotatable about its axis and about the axis of the first sun gear S1; and a first ring gear R1 meshing with the first sun gear S1 through the first planetary gear P1. The second planetary gear set 26 has rotary elements consisting of: a second sun gear S2; a second planetary gear P2; a second carrier C2 supporting the second planetary gear P2 such that the second planetary gear P2 is rotatable about its axis and about the axis of the second sun gear S2; and a second ring gear R2 meshing with the second sun gear S2 through the second planetary gear P2. Where the numbers of teeth of the first sun gear S1 and the first ring gear R1 are represented by ZS1 and ZR1, respectively, the above-indicated gear ratio $\rho$ is represented by ZS1/ZR1. Where the numbers of teeth of the second sun gear S2 and the second ring gear R2 are represented by ZS2 and ZR2, respectively, the above-indicated gear ratio $\rho 2$ is represented by ZS2/ZR2. Although the gear ratios $\rho 1$ and $\rho 2$ are both equal to 0.3, these two gear ratios may be different from each other.

In the power distributing mechanism 16, the first clutch CL1 is disposed between the second sun gear S2 and the first electric motor M1, while the second clutch CL2 is disposed between the first sun gear S1 and the first electric motor M1.

The first sun gear S1 is selectively connected to the first electric motor M1 through the second clutch CL2, while the second sun gear S2 is selectively connected to the first electric motor M1 through the first clutch CL1. The first carrier C1 and the second ring gear R2 are integrally fixed to each other and connected to the input shaft 14, that is, connected to the engine 8, while the first ring gear R1 and the second carrier C2 are integrally fixed to each other and connected to the output shaft 22, that is, connected to the drive wheels 38. When one of the first and second clutches CL1, CL2 is engaged while the other clutch is released, the power distributing mechanism 16 is placed in a continuously-variable shifting state in which the output of the engine 8 is distributed to the first electric motor M1 and the output shaft 22, owing to the differential function of the first planetary gear mechanism 24 or the second planetary gear mechanism 26, and a portion of the output of the engine 8 distributed to the first electric motor M1 is converted into an electric energy by the first electric motor M1 operated as the electric generator. The generated electric energy is stored in an electric-energy storage device 78 (shown in FIG. 7), or used to operate the second electric motor M2. The electric energy stored in the electric-energy storage device 78 is used to operate the first or second electric motor M1, M2. Thus, an electric path through which the electric energy generated by the first electric motor M1 is supplied to the second electric motor M2 or electric-energy storage device 78 is formed in the continuously-variable shifting state of the power distributing mechanism 16. In the continuously-variable shifting state, the rotating speed of the output shaft 22 is continuously variable irrespective of the operating speed of the engine 8. Namely, the power distributing mechanism 16 is placed in a differential state in which its speed ratio "i" (rotating speed $N_{IN}$ of the input shaft 14/rotating speed $N_{OUT}$ of the output shaft 22) is continuously changed from a minimum value $i_{min}$ to a maximum value $i_{max}$, that is, in the differential state or continuously-variable shifting state in which the power distributing mechanism 16 functions as an electrically controlled continuously-variable transmission the speed ratio "i" of which is continuously variable from the minimum value $i_{min}$ to the maximum value $i_{max}$.

The above-described first and second clutches CL1, CL2 are hydraulically operated frictional coupling devices used in a conventional vehicular automatic transmission. Each of these frictional coupling devices is constituted by a wet-type multiple-disc clutch including a plurality of friction plates which are superposed on each other and forced against each other by a hydraulic actuator when the clutch CL1, CL2 is engaged for connecting two members between which each clutch is interposed.

The drive system 10 constructed as described above is placed in a selected one of a forward-drive Lo mode, a forward-drive Hi mode, a reverse-drive Lo mode, a reverse-drive Hi mode, and a neutral (N) mode, as indicated in the table of FIG. 2. The forward-drive Lo mode which is suitable for low-speed running of the vehicle is established when the first clutch CL1 is engaged while the second clutch CL2 is released. The forward-drive Hi mode which is suitable for high-speed running of the vehicle is established when the first clutch CL1 is released while the second clutch is engaged. The reverse-drive Lo mode is established when the first clutch CL1 is engaged while the second clutch CL2 is released. The reverse-drive Hi mode is established when the first clutch CL1 is released while the second clutch CL2 is engaged. The neutral (N) mode is established when both of the first and second clutches CL1, CL2 are released. In the reverse-drive Lo and Hi modes, the second electric motor M2 is operated in the reverse direction while the engine 8 is held at rest.

The collinear chart of FIGS. 3 and 4 indicate, by straight lines, a relationship among the rotating speeds of the four rotary elements of the power distributing mechanism 16. The collinear charts of FIGS. 3 and 4 are defined in a two-dimensional coordinate system in which the four rotary elements are located at respective four different positions along a base line or a horizontal axis, and the gear ratios ρ of the first and second planetary gear mechanisms 24, 26 are taken along the horizontal axis, while the relative rotating speeds of the four rotary elements are taken along a vertical axis. A horizontal line X1 indicates the rotating speed of 0, while four vertical lines Y1, Y2, Y3 and Y4 respectively represent the relative rotating speeds of a first rotary element (first element) $RE1_A$ in the form of the first sun gear S1, a third rotary element (third element) $RE3_A$ in the form of the first carrier C1 and second sun gear S2 fixed to each other, a fourth rotary element (fourth element) $RE4_A$ in the form of the first ring gear R1 and second carrier C2 fixed to each other, and a second rotary element (second element) $RE2_A$ in the form of the second sun gear S2. The distances between the adjacent ones of the vertical lines Y1, Y2, Y3 and Y4 are determined by the gear ratios ρ1, ρ2 of the first and second planetary gear mechanisms 24, 26. That is, the distance between the vertical lines Y1 and Y2 (between the first sun gear S1 and first carrier C1 of the first planetary gear mechanism 24), and the distance between the vertical lines Y3 and Y4 (between the second sun gear S2 and second carrier C2 of the second planetary gear mechanism 26) correspond to "1", while the distance between the vertical lines Y2 and Y3 (between the carrier C1, C2 and the ring gear R1, R2) corresponds to the gear ratios ρ1, ρ2.

Referring to the collinear charts of FIGS. 3 and 4, the drive system 10 is arranged such that the first rotary element $RE1_A$ (first sun gear S1) of the first planetary gear mechanism 24 is selectively connected to the first electric motor M1 through the second clutch CL2, while the second rotary element $RE2_A$ (second sun gear S2) is selectively connected to the first electric motor M1 through the first clutch CL1, and such that the third rotary element $RE3_A$ (first carrier C1 and second ring gear R2) is fixed to the engine 8, while the fourth rotary element $RE4_A$ (first ring gear R1 and second carrier C2) is fixed to the output shaft 22 and the second electric motor M2, so that a rotary motion of the input shaft 14 is transmitted to the drive wheels 38 through the output shaft 22. In the collinear charts of FIGS. 3 and 4, the rotating speeds of the four rotary elements $RE1_A$, $RE2_A$, $RE3_A$ and $RE4_A$ of the power distributing mechanism 16 all lie on an inclined straight line L0, so that when these rotating speeds are different from each other, the rotating speeds decrease in the order of the first rotary element $RE1_A$, third rotary element $RE3_A$, fourth rotary element $RE4_A$ and second rotary element $RE2_A$, as seen in the collinear chart of FIG. 3, or increase in the same order, as seen in the collinear chart of FIG. 4.

The collinear chart of FIG. 3 indicates the operating state of the drive system 10 placed in a first operation mode in the form of the forward-drive Lo mode which is established in the engaged state of the first clutch CL1 and in the released state of the second clutch CL2 and in which the first electric motor M1 is connected to the second rotary element $RE2_A$ through the first clutch CL1. In the collinear charts of FIGS. 3 and 4, the third rotary element $RE3_A$ fixed to the engine 8 and the fourth rotary element $RE4_A$ fixed to the drive wheels 38 and second electric motor M2 are disposed adjacent to each other, and the first rotary element $RE1_A$ is disposed on one side of the third rotary element $RE3_A$ remote from the fourth rotary element $RE4_A$, while the second rotary element $RE2_A$ is disposed on one side of the fourth rotary element $RE4_A$ remote from the third rotary element $RE3_A$. In the collinear chart of FIG. 3 showing the state of the drive system 10 in the forward-drive Lo mode, the third rotary element $RE3_A$ is disposed on one side of the fourth rotary element $RE4_A$, while the second rotary element $RE2_A$ connected to the first electric motor M1 through the engaged first clutch CL1 is disposed on the other side of the fourth rotary element $RE4_A$. In the forward-drive Lo mode (first operation mode), the rotating speed of the fourth rotary element $RE4_A$ is held within a range between an upper limit and a lower limit which are respectively equal to one and the other of the rotating speeds of the second rotary element $RE2_A$ and the third rotary element $RE3_A$, since the rotating speeds of the four rotary elements $RE1_A$-$RE4_A$ all lie on the inclined straight line L0. In other words, the fourth rotary element $RE4_A$ is rotated at a speed between the rotating speed of the second rotary element $RE2_A$ connected to the first electric motor M1 through the engaged first clutch CL1, and the rotating speed of the third rotary element $RE3_A$. When the rotating speed of the second sun gear S2 represented by a point of intersection between the straight line L0 and the vertical line Y4 is continuously raised or lowered by controlling an output torque $T_{M1}$ of the first electric motor M1 (hereinafter referred to as "first electric motor torque $T_{M1}$"), the rotating speed of the second carrier C2 represented by a point of intersection between the straight line L0 and the vertical line Y3 is continuously raised or lowered. Thus, the rotary motion received from the engine 8 operating at a given speed is transmitted to the drive wheels 38 such that the rotating speeds of the drive wheels 38 are continuously variable. In this forward-drive Lo mode in which the second clutch CL2 is placed in the released state, the first sun gear S1 is freely rotatable, so that the rotary motion of the input shaft 14 is transmitted to the output shaft 22 primarily through the second planetary gear mechanism 26. In the forward-drive Lo mode, the rotating speed of the output shaft 22 rises with a rise of the operating speed $N_{M1}$ of the first electric motor M1 while the engine speed $N_E$ is held constant.

The collinear chart of FIG. 4 indicates the operating state of the drive system 10 placed in a second operation mode in the form of the forward-drive Hi mode which is established in the released state of the first clutch CL1 and in the engaged state of the second clutch CL2 and in which the first electric motor M1 is connected to the first rotary element $RE1_A$ through the second clutch CL2 In the collinear charts of FIG. 4, the first rotary element $RE1_A$ connected to the first electric motor M1 through the engaged second clutch CL2 is disposed on one side of the third rotary element $RE3_A$ remote from the fourth rotary element $RE4_A$, while the fourth rotary element $RE4_A$ connected to the drive wheels 38 and the second electric motor M2 is disposed on the other side of the third rotary element $RE3_A$ remote from the first rotary element $RE1_A$. In the collinear chart of FIG. 4 showing the state of the drive system 10 in the forward-drive Hi mode (second operation mode), the rotating speed of the third rotary element $RE3_A$ is held within a range between an upper limit and a lower limit which are respectively equal to one and the other of the rotating speeds of the first rotary element $RE1_A$ and the fourth rotary element $RE4_A$, since the rotating speeds of the four rotary elements $RE1_A$-$RE4_A$ all lie on the inclined straight line L0. In other words, the third rotary element $RE3_A$ is rotated at a speed between the rotating speed of the first rotary element $RE1_A$ connected to the first electric motor M1 through the engaged second clutch CL2, and the rotating speed of the fourth rotary element $RE4_A$. When the rotating speed of the first sun gear S1 represented by a point of intersection between the straight line L0 and the vertical line Y1 is continuously raised or lowered by controlling the first electric motor output torque $T_{M1}$, the rotating speed of the first ring gear R1 represented by a point of intersection between the straight line L0 and the vertical line Y3 is continuously raised or lowered. Thus, the rotary motion received from the engine 8 operating at a given speed is transmitted to the drive wheels 38 such that the rotating speeds of the drive wheels 38 are continuously variable. In this forward-drive Hi mode in which the first clutch CL1 is placed in the released state, the second sun gear S2 is freely rotatable, so that the rotary motion of the input shaft 14 is transmitted to the output shaft 22 primarily through the first planetary gear mechanism 24. In the forward-drive Hi mode, the rotating speed of the output shaft 22 increases with a decrease of the operating speed $N_{M1}$ of the first electric motor M1 while the engine speed $N_E$ is held constant.

As described above, the drive system 10 is arranged such that the operating states of the first and second clutches CL1, CL2 are controlled under the control of a hybrid control portion 52 (shown in FIG. 7), to connect the first electric motor M1 selectively to the first rotary element $RE1_A$ or the second rotary element $RE2_A$, for placing the drive system 10 in a selected one of the forward-drive Lo mode or Hi mode. The hybrid control portion 52 will be described.

Figure 5:
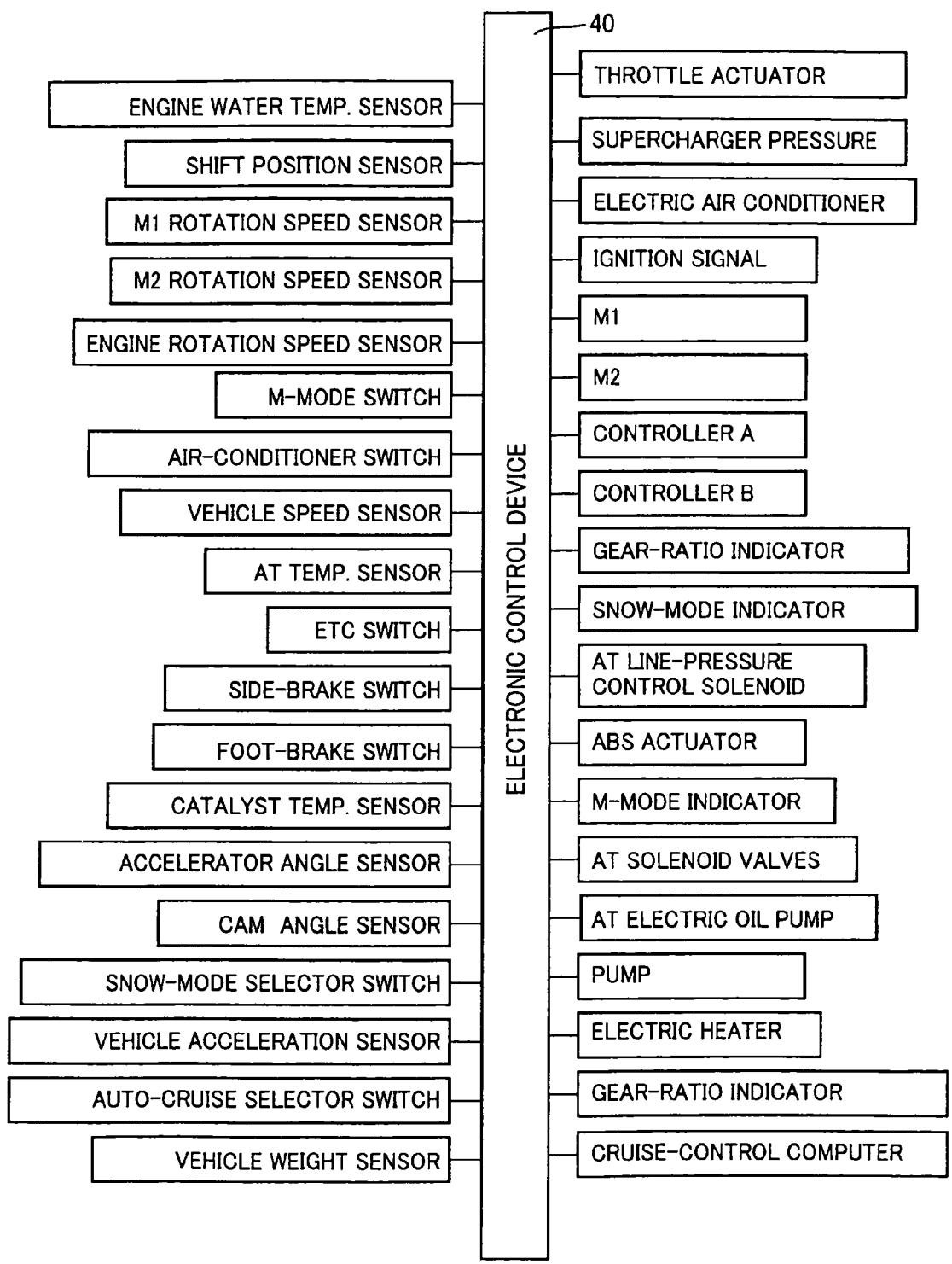
FIG. 5 is a view indicating input output signals of an electronic control device for controlling the hybrid vehicle drive system of FIG. 1.

FIG. 5 indicates signals received by an electronic control device 40 which is provided to control the drive system 10 of the present embodiment. FIG. 5 also indicates signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the RAM, to implement hybrid drive controls of the engine 8 and electric motors M1 and M2, and an operation mode control to select the operation mode of the drive system 10.

The electronic control device 40 is arranged to receive various sensors and switches shown in FIG. 5, various signals such as: a signal indicative of a temperature of cooling water of the engine 8; a signal indicative of a selected operating position of a shift lever 48 of a manually operable shifting device 46 (shown in FIG. 6); a signal indicative of the operating speed $N_E$ of the engine 8; a signal indicative of the gear ratios of the power distributing mechanism 16; a signal indicative of an M mode (manual shifting drive mode); a signal indicative of an operated state of an air conditioner; a signal indicative of a vehicle speed corresponding to the rotating speed of the output shaft 22; a signal indicative of a temperature of a working oil or fluid of the power distributing mechanism 16; a signal indicative of an operated state of a side brake; a signal indicative of an operated state of a foot brake; a signal indicative of a temperature of a catalyst; a signal indicative of an amount of operation (an angle of operation) of a manually operable vehicle accelerating member in the form of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the wheels of the vehicle; a signal indicative of the operating speed $N_{M1}$ of the first electric motor M1 (hereinafter referred to as "first electric motor speed $N_{M1}$"); and a signal indicative of the operating speed $N_{M2}$ of the second electric motor M2 (hereinafter referred to as "second electric motor speed $N_{M2}$").

Figure 6:
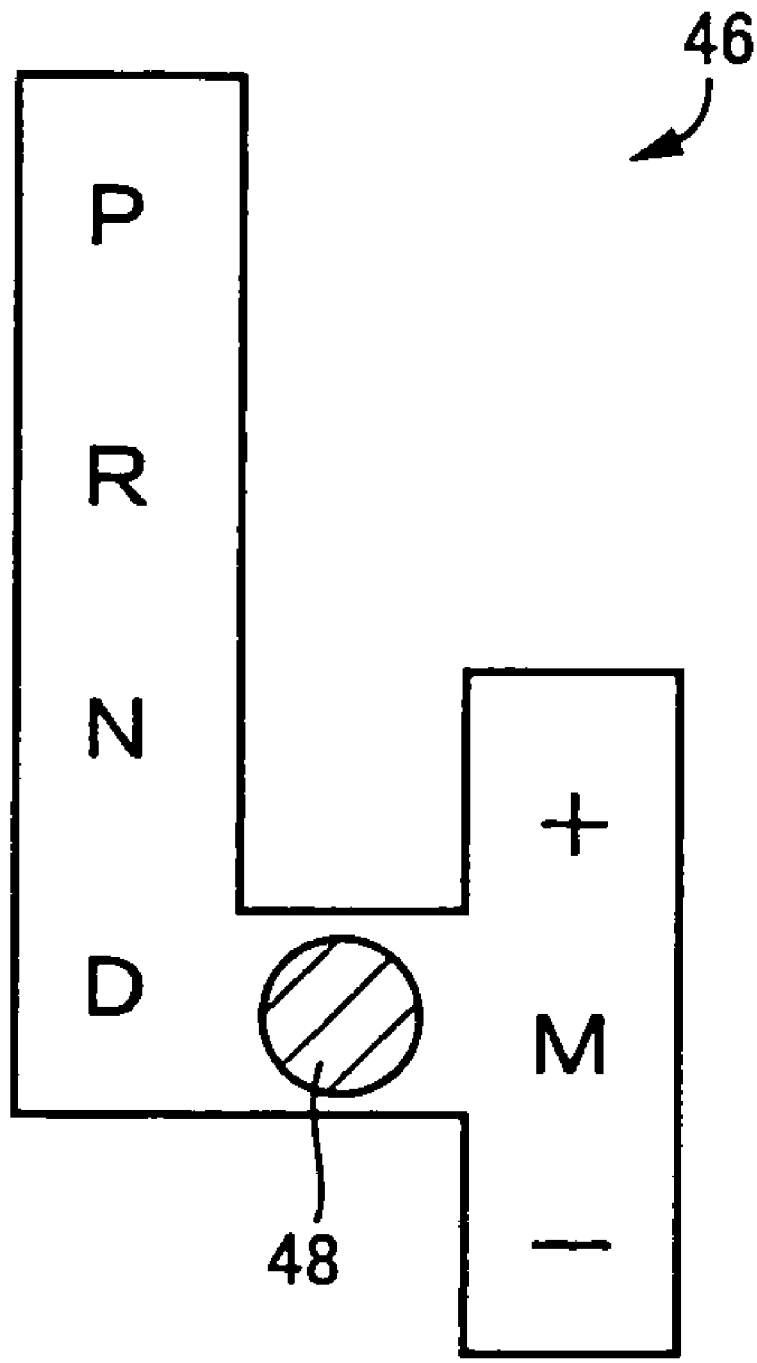
FIG. 6 is view showing an example of a manually operable shifting device which includes a shift lever having a plurality of shift positions and which is used to control the hybrid vehicle drive system.

FIG. 6 shows an example of a manually operable shifting device in the form of the above-indicated shifting device 46. The shifting device 46 includes the above-described shift lever 48, which is disposed laterally adjacent to an operator's seat, for example, and which is manually operated to select one of a plurality of shift positions $P_{SH}$.

The shift positions $P_{SH}$ of the shift lever 48 consist of: a parking position P for placing the drive system 10 in a neutral state in which the power transmitting path through the power distributing mechanism 16 is disconnected and in which the output shaft 22 is locked; a reverse-drive position R for driving the vehicle in the rearward or reverse direction; a neutral position N for placing the drive system 10 in the neutral state; an automatic forward-drive shifting position D; and a manual forward-drive shifting position M. When the shift lever 48 is operated to the automatic forward-drive shifting position D, the drive system 10 is placed in an automatic shifting mode in which the speed ratio "i" of the drive system 10 is automatically changed within a predetermined range. When the shift lever 48 is operated to the manual forward-drive shifting position M, the drive system 10 is placed in a manual shifting mode in which the lower limit of the speed ratio "i" of the drive system 10 available in the automatic shifting mode can be manually changed.

The above-indicated parking position P and the neutral position N of the shift lever 48 are non-drive positions selected when the vehicle is not driven, while the above-indicated reverse-drive position R and automatic and manual forward-drive positions D, M are drive positions selected when the vehicle is driven. In the non-drive positions P, N, the power transmitting path through the power distributing mechanism 16 is in the power cut-off state established by releasing both of the first ands second clutches CL1 and CL2, as shown in the table of FIG. 2. In the drive positions R, D, M, the power transmitting path through the power distributing mechanism 16 is in the power transmitting state established by engaging at least one of the first ands second clutches CL1 and CL2, as also shown in the table of FIG. 2.

Described in detail, a manual operation of the shift lever 48 from the parking position P or neutral position N to the reverse-drive position R or automatic forward-drive position D causes the first or second clutch CL1, CL2 to be engaged for switching the power transmitting path of the power distributing mechanism 16 from the power cut-off state to the power transmitting state. A manual operation of the shift lever 48 from the reverse-drive position R or automatic forward-drive position D to the parking position P or neutral position N causes the first and second clutches CL1, CL2 to be released for switching the power transmitting path from the power transmitting state to the power cut-off state.

Figure 8:
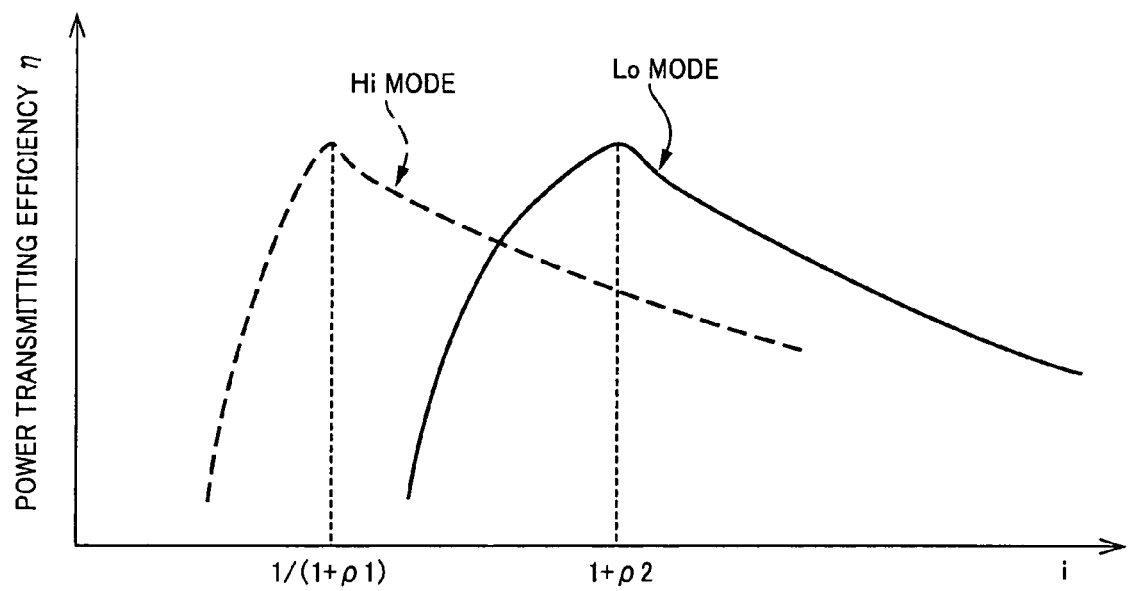
FIG. 8 is a view indicating examples of a relationship between a power transmitting efficiency and a speed ratio of the hybrid vehicle drive system in the different operation modes (Lo Mode) and Hi mode)

FIG. 7 is a functional block diagram for explaining major control functions of the electronic control device 40, which includes the above-indicated hybrid control portion 52, a mode-switching-condition determining portion 56, and a vehicle-condition determining portion 58. FIG. 8 is a view indicating examples of a relationship between overall power transmitting efficiency η and speed ratio "i" of the drive system 10 in the forward-drive Lo Mode and forward-drive Hi mode. The power transmitting efficiency of the mechanical path through which the output of the engine 8 is transmitted as a mechanical energy to the drive wheels 38, without conversion of this mechanical energy into an electric energy, does not change considerably with a change of the speed ratio "i". In this sense, the view of FIG. 8 is considered to indicate examples of a relationship between power transmitting efficiency of the electric path and the speed ratio "i" in the forward-drive Lo and Hi modes of the drive system 10. In the present embodiment, the engine 8 and the input shaft 14 are connected directly to each other, the rotating speed $N_{IN}$ of the input shaft 14 (hereinafter referred to as "input shaft speed $N_{IN}$") is equal to the engine speed $N_E$, and the rotating speed $N_{OUT}$ of the output shaft 22 (hereinafter referred to as "output shaft speed $N_{OUT}$") is proportional to the vehicle speed V.

The hybrid control portion 52 is configured to place the drive system 10 in a motor drive mode, that is, to operate the second electric motor M2 as the drive power source, when the vehicle is driven at a comparatively low speed and under a comparatively low load, for instance, when the vehicle is started. The hybrid control portion 52 is further configured to control the engine 8 to be operated in an operating range of high efficiency, and control the first and second electric motors M1, M2 so as to optimize a proportion between a drive force generated by the engine 8 and a drive force generated by the first electric motor M1 and/or second electric motor M2, when the vehicle is driven at an ordinary speed and under an ordinary load. For instance, the hybrid control portion 52 calculates a target vehicle output at the present running speed of the vehicle, on the basis of the operating amount of the accelerator pedal used as an operator's required vehicle output and the vehicle running speed, and calculate a target total vehicle output on the basis of the calculated target vehicle output and a required amount of generation of an electric energy by the first electric motor M1. The hybrid control portion 52 calculates a target output of the engine 8 to obtain the calculated target total vehicle output, and controls the engine speed $N_E$ and torque $T_E$, so as to obtain the calculated target engine output, and controls the amount of generation of the electric energy by the first electric motor M1. In the hybrid control, the power distributing mechanism 16 is controlled to function as the electrically controlled continuously-variable transmission, for optimum coordination between the engine speed $N_E$ for its efficient operation and the output shaft speed $N_{OUT}$ determined by the vehicle speed V. That is, the hybrid control portion 52 determines a target value of the speed ratio "i" of the drive system 10 (power distributing mechanism 16), so that the engine 8 is operated according to a highest-fuel-economy curve stored in memory means. The highest-fuel-economy curve is obtained by experimentation so as to satisfy both of the desired operating efficiency and the highest fuel economy of the engine 8. The hybrid control portion 52 controls the first electric motor M1, so as to obtain the target value of the speed ratio "i", so that the actual speed ratio "i" is controlled within a predetermined range.

In the hybrid control, the hybrid control portion 52 controls an inverter 76 such that the electric energy generated by the first electric motor M1 is supplied to the above-indicated electric-energy storage device 78 and the second electric motor M2 through the inverter 76. That is, a major portion of the drive force produced by the engine 8 is mechanically transmitted to the output shaft 22, while the remaining portion of the drive force is consumed by the first electric motor M1 to convert this portion into the electric energy, which is supplied through the inverter 76 to the second electric motor M2, so that the second electric motor M2 is operated with the supplied electric energy, to produce a mechanical energy to be transmitted to the output shaft 22. Further, the electric energy stored in the electric-energy storage device 78 may be supplied to the first electric motor M1 through the inverter 76 so that the first electric motor M1 is operated to produce a mechanical energy to be transmitted to the output shaft 22. Thus, the drive system 10 is provided with the electric path through which the electric energy generated by conversion of a portion of the drive force of the engine 8 is converted into the mechanical energy. The hybrid control portion 52 permits the vehicle to run in the motor drive mode, while utilizing the electric CVT function of the power distributing mechanism 16, irrespective of whether the engine 8 is at rest or in an idling state.

The hybrid control portion 52 includes an operation mode control portion 54, which is configured to change the operation mode of the drive system 10, according to determinations made by the mode-switching-condition determining portion 56. To change the operation mode, the operation mode control portion 54 controls the operating states of the first and second clutches CL1, CL2, to connect the first electric motor M1 selectively to one of the first rotary element $RE1_A$ and the second rotary element $RE2_A$. However, the operation mode control portion 54 is not configured to merely control the operating states of the first and second clutches CL1, CL2 for switching the drive system 10 between the first and second operation modes (forward-drive Lo mode and Hi mode). Namely, the operation mode control portion 54 implements a synchronous mode switching control to control the engine speed $N_E$, first electric motor speed $N_{M1}$ and hydraulic pressures of the first and second clutches CL1, CL2, so as to minimize, preferably, to zero a difference between the values of the first electric motor speed $N_{M1}$ before and after the switching or change of the operation mode of the drive system 10. The minimization of the difference between the values of the first electric motor speed $N_{M1}$ before and after the switching of the operation mode is equivalent to minimization of an angle of the straight line L0 with respect to the horizontal line X1 in the collinear charts of FIGS. 3 and 4, that is, establishment of the parallelism of the straight line L0 with the horizontal line X1. In other words, the minimization of the above-indicated speed difference means minimization of a difference between the first electric motor speed $N_{M1}$ represented by a point of intersection between the straight line L0 and the vertical line Y1 or Y4 and the second electric motor speed $N_{M2}$ represented by a point of intersection between the straight line L0 and the vertical line Y3. The synchronous mode switching control by the operation mode control portion 54 will be described in detail.

The mode-switching-condition determining portion 56 is configured to determine whether the drive system 10 is placed in the forward-drive Lo mode or in the forward-drive Hi mode. The mode-switching-condition determining portion 56 determines that the drive system 10 is placed in the forward-drive Lo mode, if the first clutch CL1 is placed in the engaged state while the second clutch CL2 is placed in the released state, and determines that the drive system 10 is placed in the forward-drive Hi mode, if the first clutch CL1 is placed in the released state while the second clutch CL2 is placed in the engaged state.

The mode-switching-condition determining portion 56 is configured to further determine whether the vehicle speed V is rising or falling, that is, whether the vehicle is in an accelerating run or in a decelerating run.

The mode-switching-condition determining portion 56 is configured to further determine whether the first electric motor speed $N_{M1}$ and the second electric motor speed $N_{M2}$ are almost equal to each other, that is, whether the straight line L0 in the collinear charts of FIGS. 3 and 4 is horizontal. Strictly speaking, the first and second electric motor speeds $N_{M1}$ and $N_{M2}$ are rarely equal to each other in a normal run of the vehicle. In view of this fact, the mode-switching-condition determining portion 56 determines that the first and second electric motor speeds $N_{M1}$ and $N_{M2}$ are almost equal to each other, when a difference between these two speeds $N_{M1}$ and $N_{M2}$ is smaller than a predetermined threshold value. This threshold value is obtained by experimentation, as an upper limit of the above-indicated speed difference below which a shock of switching of the operation mode of the drive system 10 is tolerable. The thus obtained threshold value is stored in the mode-switching-condition determining portion 56.

The vehicle-condition determining portion 58 is configured to determine whether the required output torque $T_{OUT}$ of the drive system 10 is larger than a predetermined threshold value. This threshold value is obtained by experimentation, as a lower limit of the required output torque $T_{OUT}$ above which the mode switching from the forward-drive Lo mode to the forward-drive Hi mode should be delayed for a given length of time during which the vehicle is kept running in the accelerating state in the Lo mode, according to the intention of the vehicle operator. The thus obtained threshold value is stored in the vehicle-condition determining portion 58. Since the required output torque $T_{OUT}$ increases with an increase of the operating amount $A_{CC}$ of the accelerator pedal, the required output torque $T_{OUT}$ can be determined on the basis of the operating amount $A_{CC}$ of the accelerator pedal.

The operation mode control portion 54 is basically arranged to minimize the difference between the first and second electric motor speeds $N_{M1}$ and $N_{M2}$, when the vehicle speed V is raised, that is, when the vehicle is in the accelerating run in the forward-drive Lo mode suitable for low-speed running of the vehicle, and when the vehicle speed V is lowered, that is, when the vehicle is in the decelerating run in the forward-drive Hi mode suitable for high-speed running of the vehicle.

The operation mode control portion 54 is further arranged to implement the synchronous mode switching control for switching the operation mode of the drive system 10 from the forward-drive Lo mode to the forward-drive Hi mode by releasing the first clutch CL1 and at the same time engaging the second clutch CL2, when the mode-switching-condition determining portion 56 determines that the first and second electric motor speeds $N_{M1}$ and $N_{M2}$ are almost equal to each other in the accelerating run of the vehicle in the forward-drive Lo mode. If the vehicle-condition determining portion 58 determines that the required output torque $T_{OUT}$ of the drive system 10 is larger than the predetermined threshold value, however, the operation mode control portion 54 delays the mode switching to the Hi mode, and keeps the accelerating run of the vehicle in the Lo mode, irrespective of the determination by the mode-switching-condition determining portion 56, and implements the mode switching from the Lo mode to the Hi mode when the vehicle speed V has been raised to a predetermined value. During the continued accelerating run of the vehicle in the Lo mode as a result of the delay of the mode switching to the Hi mode, in order to drive the vehicle according to the intention of the vehicle operator, the first and second electric motor speeds $N_{M1}$ and $N_{M2}$ are not necessarily almost equal to each other. Therefore, the following mode switching from the Lo mode to the Hi mode is not necessarily implemented in the synchronous mode switching fashion. When the engine speed $N_E$ is held constant, a rise of the first electric motor speed $N_{M1}$ in the forward-drive Lo mode will cause a rise of the output shaft speed $N_{OUT}$ (second electric motor speed $N_{M2}$), as is apparent from the collinear chart of FIG. 3 which indicates the relative rotating speeds of the rotary elements of the power distributing mechanism 16 in the Lo mode, while a drop of the first electric motor speed $N_{M1}$ in the forward-drive Hi mode will cause a rise of the output shaft speed $N_{OUT}$ (second electric motor speed $N_{M2}$), as is apparent from the collinear chart of FIG. 4 which indicates the relative rotating speeds of the rotary elements of the power distributing mechanism 16 in the Hi mode. That is, the mode switching between the Lo mode and the Hi mode will cause reversal of the direction of change of the output shaft speed $N_{OUT}$ caused by a change (rise) of the first electric motor speed $N_{M1}$. In view of this fact, the operation mode control portion 54 is configured to reverse the direction of the output torque of the first electric motor M1 after the switching of the operation mode of the drive system 10 from the Lo mode to the Hi mode.

The operation mode control portion 54 is further configured to implement the synchronous mode switching control for switching the operation mode of the drive system 10 from the forward-drive Hi mode to the forward-drive Lo mode by releasing the second clutch CL2 and at the same time engaging the first clutch CL1, when the mode-switching-condition determining portion 56 determines that the first and second electric motor speeds $N_{M1}$ and $N_{M2}$ are almost equal to each other in the decelerating run of the vehicle in the forward-drive Hi mode. As in the case of the mode switching from the Lo mode to the Hi mode, the operation mode control portion 54 reverse the direction of the output torque of the first electric motor M1 after the switching of the operation mode of the drive system 10 from the Hi mode to the Lo mode.

During the synchronous mode switching control by the operation mode control portion 54 for switching the operation mode of the drive system 10 between the forward-drive Lo and Hi modes, the straight line L0 in the collinear charts of FIGS. 3 and 4 is almost parallel to the horizontal line X1, that is, the speed ratio "i" is almost equal to "1". The speed ratio "i" equal to "1" is intermediate between $\{1/(1+\rho1)\}$ and $(1+\rho2)$ indicated in FIG. 8. The operation mode control portion 54 selects the forward-drive Hi mode when the speed ratio "i" is lower than "1", that is, when the vehicle speed V is relatively high, and the forward-drive Lo mode when the speed ratio "i" is higher than "1", that is, when the vehicle speed V is relatively low.

Figure 9:
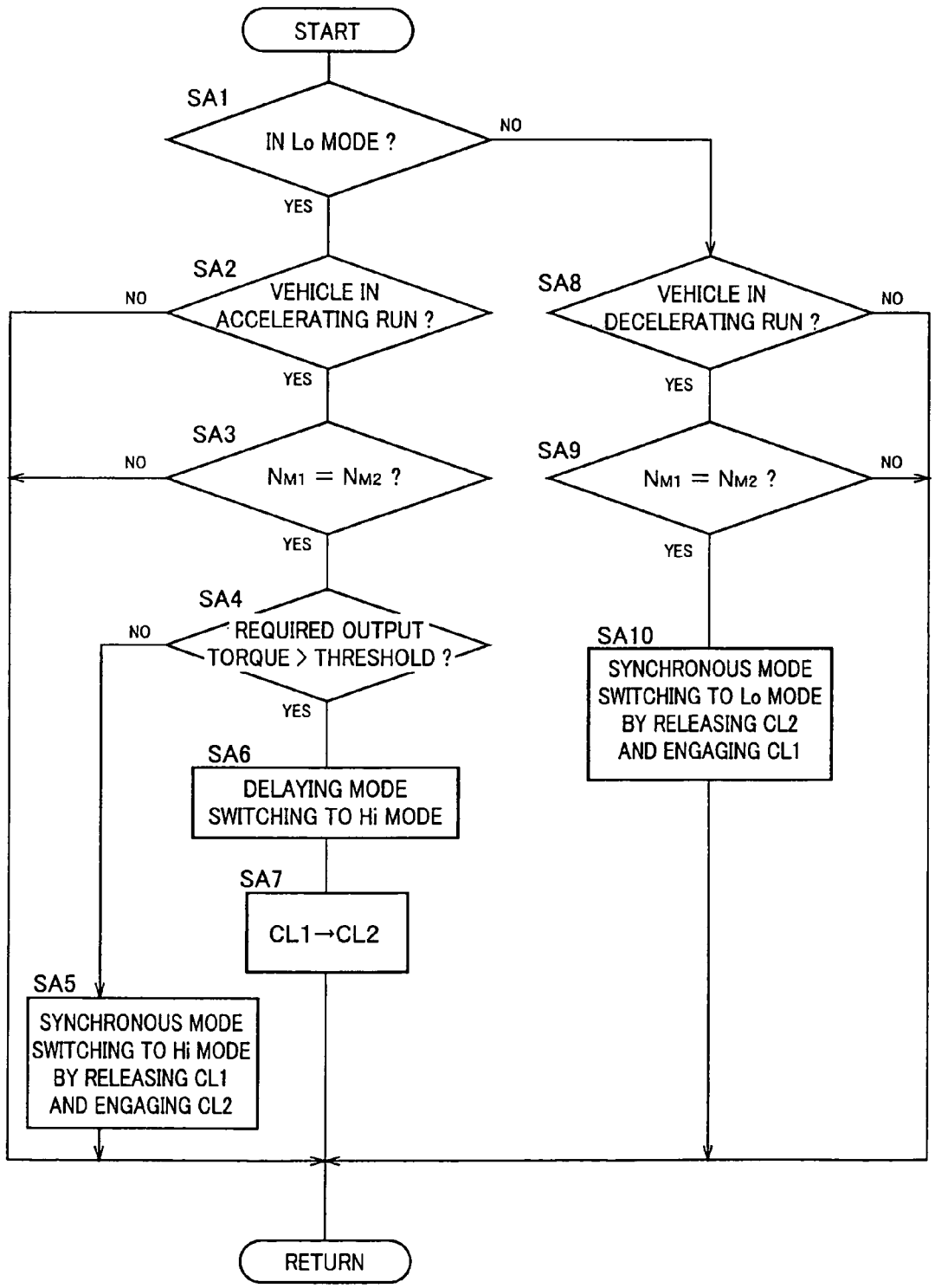
FIG. 9 is a flow chart illustrating a control routine executed by the electronic control device of FIG. 5, to switch the operation mode of the drive system during forward running of the hybrid vehicle.

Referring next to the flow chart of FIG. 9, there is illustrated a control routine executed by the electronic control device 40 to switch the operation mode of the drive system 10 between the forward-drive Lo mode and Hi mode during forward running of the vehicle. This control routine is repeatedly executed with an extremely short cycle time of several milliseconds to several tens of milliseconds.

The control routine of FIG. 9 is initiated with step SA1 to determine whether the drive system 10 is currently placed in the forward-drive Lo mode (first operation mode) or not. When an affirmative determination is obtained in step SA1, that is, when the drive system 10 is placed in the Lo mode, the control flow goes to step SA2. When a negative determination is obtained in step SA1, that is, when the drive system 10 is placed in the Hi mode, the control flow goes to step SA8.

Step SA2 is provided to determine whether the vehicle speed V is rising, that is, whether the vehicle is in an accelerating run. When an affirmative determination is obtained in step SA2, that is, when the vehicle is in the accelerating run, the control flow goes to step SA3. When a negative determination is obtained in step SA2, that is, when the vehicle is in a decelerating run, one cycle of execution of the present control routine of FIG. 9 is terminated.

Step SA3 is provided to determine whether the first and second electric motor speeds $N_{M1}$ and $N_{M2}$ are almost equal to each other, that is, whether a difference between the first and second electric motor speeds $N_{M1}$ and $N_{M2}$ is smaller than the predetermined threshold value. When an affirmative determination is obtained in step SA3, that is, the first and second electric motor speeds $N_{M1}$ and $N_{M2}$ are almost equal to each other, the control flow goes to step SA4. When a negative determination is obtained in step SA3, one cycle of execution of the present control routine is terminated.

Step SA4 corresponding to the vehicle-condition determining portion 58 is provided to determine whether the required output torque $T_{OUT}$ of the drive system 10 is larger than the predetermined threshold value. When an affirmative determination is obtained in step SA4, that is, when the required output torque $T_{OUT}$ of the drive system 10 is larger than the predetermined threshold value, the control flow goes to step SA6. When a negative determination is obtained in step SA4, the control flow goes to step SA5.

In step SA5, the first clutch CL1 which has been placed in the engaged state is released, while at the same time the second clutch CL2 is engaged. Namely, the synchronous mode switching control is implemented to switch the operation mode of the drive system 10 from the forward-drive Lo mode (first operation mode) to the forward-drive Hi mode (second operation mode). After the switching of the operation mode, the direction of the output torque of the first electric motor M1 is reversed, as described above. This reversal of the direction of the output torque of the first electric motor M1 is also made in steps SA7 and SA10 described below.

In step SA6, the mode switching from the Lo mode to the Hi mode is delayed, and the accelerating run of the vehicle is continued with the drive system 10 kept in the Lo mode. When the vehicle speed V has been raised to the predetermined value, the control flow goes to step SA7 in which the operation mode is switched from the Lo mode to the Hi mode. In this mode switching control, the first and second electric motor speeds $N_{M1}$ and $N_{M2}$ are not necessarily almost equal to each other. That is, the mode switching control in step SA7 is not necessarily the synchronous mode switching control so as to minimize the difference between the speeds $N_{M1}$ and $N_{M2}$.

Step SA8 is provided to determine whether the vehicle speed V is falling, that is, whether the vehicle is in a decelerating run. When an affirmative determination is obtained in step SA8, that is, when the vehicle is in the decelerating run, the control flow goes to step SA9. When a negative determination is obtained in step SA8, one cycle of execution of the present control routine is terminated.

Step SA9 is provided to determine whether the first and second electric motor speeds $N_{M1}$ and $N_{M2}$ are almost equal to each other. As in step SA3, the affirmative determination is obtained in step SA9 when the difference between first and second electric motor speeds $N_{M1}$ and $N_{M2}$ is smaller than the predetermined threshold value. If an affirmative determination is obtained in step SA9, that is, the first and second electric motor speeds $N_{M1}$ and $N_{M2}$ are almost equal to each other, the control flow goes to step SA10. If a negative determination is obtained in step SA9, one cycle of execution of the present control routine is terminated. It will be understood that steps SA1-SA3, SA8 and SA9 correspond to the mode-switching-condition determining portion 56.

In step SA10, the second clutch CL2 which has been placed in the engaged state is released, while at the same time the first clutch CL1 is engaged. Namely, the synchronous mode switching control is implemented to switch the operation mode of the drive system 10 from the forward-drive Hi mode (second operation mode) to the forward-drive Lo mode (first operation mode). It will be understood that steps SA5-SA7 and SA10 correspond to the operation mode control portion 54.

The drive system 10 constructed according to the present embodiment of the invention has the following advantages (A1)-(A7):

(A1) The four rotary elements $RE1_A$, $RE2_A$, $RE3_A$ and $RE4_A$ of the power distributing mechanism 16 are arranged to permit the drive system 10 to be placed in the selected one of the first operation mode in the form of the forward-drive Lo mode and the second operation mode in the form of the forward-drive Hi mode. In the first operation mode, the third rotary element $RE3_A$ connected to the engine 8 and the second rotary element $RE2_A$ connected to the first electric motor M1 through the first clutch CL1 are disposed on the opposite sides of the fourth rotary element RE4$_A$ connected to the drive wheels 38 and the second electric motor M2, as seen in the collinear chart of FIG. 3 in which the four rotary elements RE1$_A$, RE2$_A$, RE3$_A$ and RE4$_A$ are located at the respective four different positions along the base line of the collinear chart. In the second operation mode, the first rotary element RE1$_A$ connected to the first electric motor M1 through the second clutch CL2 and the above-indicated fourth rotary element RE4$_A$ are disposed on the opposite sides of the above-indicated third rotary element, as seen in the collinear chart of FIG. 4. Stated differently, the drive system 10 is constructed to be selectively placed in the Lo mode (first operation mode) in which the fourth rotary element RE4$_A$ of the power distributing mechanism 16 connected to the drive wheels 38 and the second electric motor M2 is rotated at a speed intermediate between the rotating speed of the third rotary element RE3$_A$ connected to the engine 8 and the rotating speed of the second rotary element RE2$_A$ connected to the first electric motor M1 through the first clutch CL1, or in the Hi mode (second operation mode) in which the above-indicated third rotary element RE3$_A$ is rotated at a speed intermediate between the rotating speed of the fourth rotary element RE4$_A$ and the rotating speed of the first rotary element RE1$_A$ connected to the first electric motor M1 through the second clutch CL2. Therefore, the relative rotating speeds of the engine 8, first electric motor M1 and drive wheels 38 in the Lo mode are different from those in the Hi mode, so that the relationship between the speed ratio "i" and power transmitting efficiency η of the drive system 10 in the Lo mode is different from that in the Hi mode. Accordingly, the power transmitting efficiency of the drive system 10 can be held high enough to assure a high degree of fuel economy of the hybrid vehicle, over a wide range of the overall speed ratio "i" of the drive system 10, by suitably switching the drive system 10 between its Lo and Hi modes. In both of the Lo and Hi modes, the second electric motor M2 is connected to the fourth rotary element RE4$_A$ to which the drive wheels 38 are connected. Namely, the rotary element to which the second electric motor M2 and the drive wheels 38 are connected is not changed when the operation mode of the drive system 10 is changed, so that the drive system 10 can be smoothly switched between the Lo and Hi modes.

Figure 10:
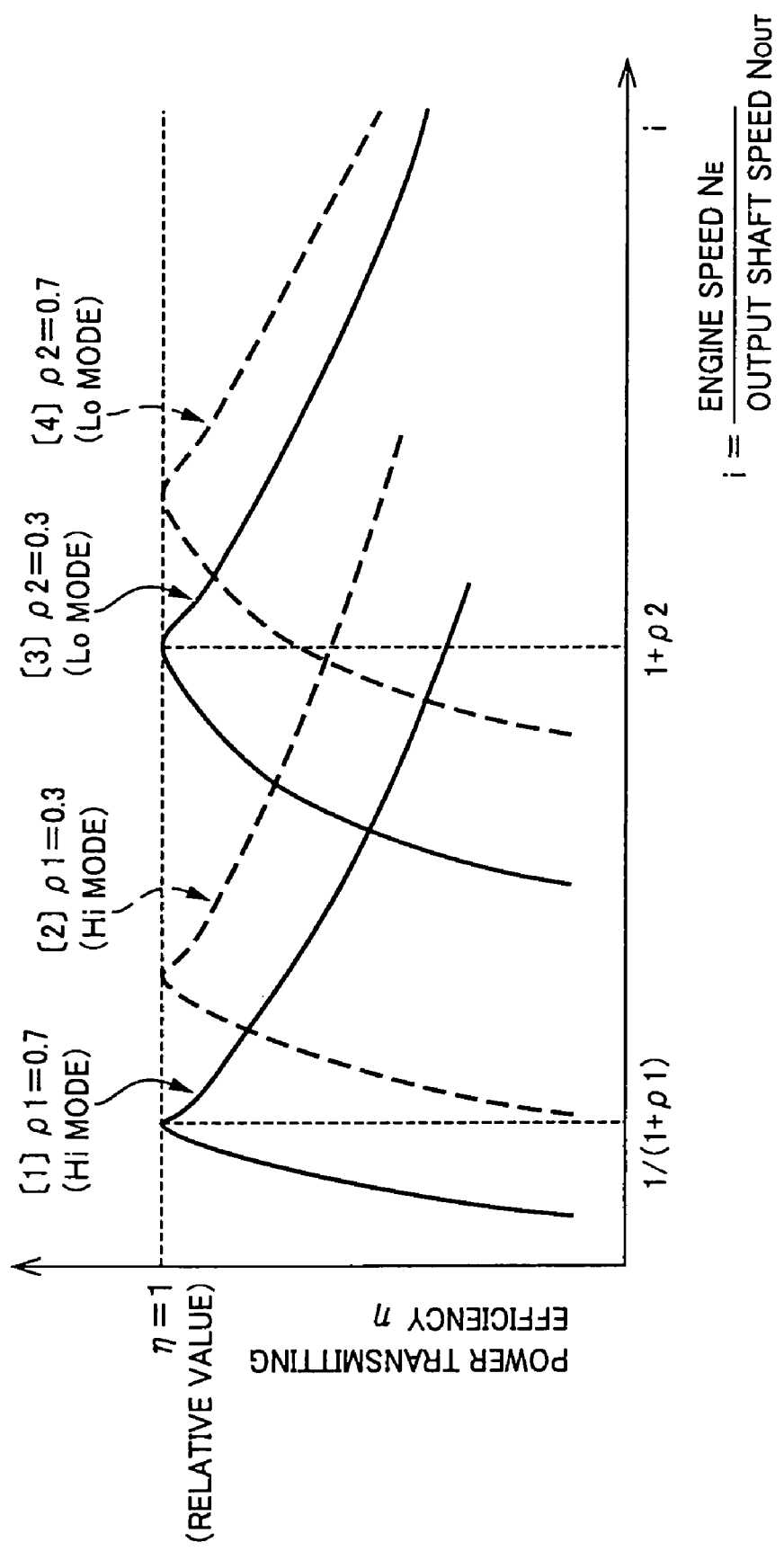
FIG. 10 is a view similar to that of FIG. 8, indicating examples of the relationship between the power transmitting efficiency and the speed ratio of the hybrid vehicle drive system, and explaining a change of the power transmitting efficiency, where an order of arrangement of an engine, a first electric motor and an output shaft as viewed in the collinear chart changes as a result of a change of the operation mode, and where the gear ratio changes as a result of the change of the operation mode.

A reason why the drive system 10 according to the present embodiment has a high degree of power transmitting efficiency η will be described by reference to FIG. 10. Like FIG. 8, FIG. 10 indicates examples of the relationship between the power transmitting efficiency η and the speed ratio "i" of the drive system 10. FIG. 10 explains a change of the power transmitting efficiency of the electric path, that is, a change of the power transmitting efficiency η of the drive system 10, which change is caused due to a change of the order of arrangement in the collinear chart of the rotary elements connected to the engine 8, first electric motor M1 and output shaft 22 according to the present embodiment of the invention, and by a change of the gear ratio ρ, when the operation mode of the drive system 10 is switched between the forward-drive Lo and Hi modes. The following equation (1) is an equation for calculating the power transmitting efficiency η (absolute value) of the drive system 10 during acceleration of the vehicle with the first electric motor M1 being operated as the electric generator in the Hi mode established when the first clutch CL1 is placed in the released state while the second clutch CL2 is placed in the engaged state. The following equation (2) is an equation for calculating the power transmitting efficiency η (absolute value) of the drive system 10 during acceleration of the vehicle with the first electric motor M1 being operated in the reverse direction as the electric motor in the Hi mode. The following equation (3) is an equation for calculating the power transmitting efficiency η (absolute value) of the drive system 10 during acceleration of the vehicle with the first electric motor M1 being operated as the electric generator in the Lo mode established when the first clutch CL1 is placed in the engaged state while the second clutch CL2 is placed in the released state. The following equation (4) is an equation for calculating the power transmitting efficiency η (absolute value) of the drive system 10 during acceleration of the vehicle with the first electric motor M1 being operated in the reverse direction as the electric motor in the Lo mode. Where the speed ratio "i" of the drive system 10 in the equations (1) and (2) is equal to $\{1/(1+\rho1)\}$, the power transmitting efficiency η is equal to "1". Where the speed ratio "i" taken along the horizontal axis of FIG. 10 is equal to $\{1/(1+\rho1)\}$ or higher, power transmitting efficiency curves [1] and [2] are obtained according to the equation (1). Where the speed ratio "i" is lower than $\{1/(1+\rho1)\}$, the power transmitting efficiency curves [1] and [2] are obtained according to the equation (2). Where the speed ratio "i" in the equations (3) and (4) is equal to $(1+\rho2)$, the power transmitting efficiency η is equal to "1". Where the speed ratio "i" taken along the horizontal axis of FIG. 10 is equal to $(1+\rho2)$ or higher, power transmitting efficiency curves [3] and [4] are obtained according to the equation (3). Where the speed ratio "i" is lower than $(1+\rho2)$, the power transmitting efficiency curves [3] and [4] are obtained according to the equation (4). It will be understood from FIG. 10 that the power transmitting efficiency η of the drive system 10 can be held sufficiently high over a wider range of the overall speed ratio "i" of the drive system 10 where the order of arrangement in the collinear chart of the rotary elements connected to the engine 8, first electric motor M1 and output shaft 22 is changed depending upon the speed ratio "i" (where one of the power transmitting efficiency curves [2] and [3] is selected) according to the present embodiment, than where the gear ratio ρ of the power distributing mechanism 16 is changed depending upon the speed ratio "i" (where one of the power transmitting efficiency curves [1] and [2] is selected, or where one of the power transmitting efficiency curves [3] and {4] is selected). In the present embodiment, the gear ratios ρ1 and ρ2 are both held constant at 0.3, and the forward-drive Hi mode is selected when the speed ratio "i" is lower than the value intermediate between $\{1/(1+\rho1)\}$ and $(1+\rho2)$, that is, when the vehicle speed V is relatively high, and the forward-drive Lo mode when the speed ratio "i" is higher than the value intermediate between $\{1/(1+\rho1)\}$ and $(1+\rho2)$, that is, when the vehicle speed V is relatively low. Further, the drive system 10 according to the present embodiment has sufficiently high power transmitting efficiency η over a wider range of the overall speed ratio "i", than a drive system which is not switchable between the Lo and Hi modes and which includes a transmission disposed between the output shaft 22 and the drive wheels 38. That is, a comparatively large distance between apexes of the two power transmitting efficiency curves {2} and [3] means that the drive system 10 can have sufficiently high power transmitting efficiency η over a comparatively wide range of the speed ratio "i", with relatively simple construction of the drive system 10.

$$\eta=[\eta_e\times\{i-1/(1+\rho1)\}+1/(1+\rho1)]/i \quad (1)$$

$$\eta=[\{i-1/(1+\rho1)\}/\eta_e+1/(1+\rho1)]/i \quad (2)$$

$$\eta=[\eta_e\times\{i-1/(1+\rho2)\}+1/(1+\rho2)]/i \quad (3)$$

$$\eta=[\{i-1/(1+\rho2)\}/\eta_e+1/(1+\rho2)]/i \quad (4)$$

(A2) In the present drive system 10, the second electric motor M2 is connected directly to the power transmitting path between the drive wheels 38 and the power distributing mechanism 16. This connection of the second electric motor M2 to the power transmitting path between the drive wheels 38 and the power distributing mechanism 16 is maintained irrespective of the switching of the operation mode of the drive system 10, so that the operation mode can be smoothly switched between the forward-drive Lo and Hi modes (first and second operation modes).

(A3) The third rotary element $RE3_A$ connected to the engine 8 and the fourth rotary element $RE4_A$ connected to the drive wheels 38 and the second electric motor M2 are disposed adjacent to each other, while the first and second rotary elements $RE1_A$, $RE2_A$ are disposed on the respective opposite sides of the third and fourth rotary elements $RE3_A$, $RE4_A$ disposed adjacent to each other, as seen in the collinear charts of FIGS. 3 and 4, and the first electric motor M1 is connected to a selected one of the first and second rotary elements $RE1_A$, $RE2_A$, to place the drive system 10 in the selected one of the forward-drive Lo and Hi modes (first and second operation modes). Stated differently, the power distributing mechanism 16 includes the first and second rotary elements $RE1_A$, $RE2_A$ connectable to the first electric motor M1, the third rotary element $RE3_A$ connected to the engine 8, and the fourth rotary element $RE4_A$ connected to the drive wheels 38 and the second electric motor M2. When the four rotary elements have different rotating speeds, these different rotating speeds increase in the order of the first, third, fourth and second rotary elements $RE1_A$, $RE3_A$, $RE4_A$, $RE2_A$, or in the reverse order. The first electric motor M1 is connected to the second rotary element $RE2_A$, to establish the Lo mode (first operation mode), and to the first rotary element $RE1_A$, to establish the Hi mode (second operation mode). Accordingly, the relationship between the speed ratio "i" and the power transmitting efficiency $\eta$ of the drive system 10 can be changed by connecting the first electric motor M1 selectively to one of the first and second rotary elements $RE1_A$, $RE2_A$, so that the power transmitting efficiency $\eta$ of the drive system 10 can be held high enough to assure a high degree of fuel economy of the hybrid vehicle, over a wide range of the speed ratio "i" of the drive system 10.

(A4) The present drive system 10 is switched between the forward-drive Lo and Hi modes (first and second operation modes) under the synchronous mode switching control implemented so as to minimize the difference between the operating speeds of the first electric motor M1 before and after switching of the drive system 10 between the two forward-drive Lo and Hi modes, so that a shock generated upon switching of the drive system 10 between the Lo and Hi modes can be effectively reduced.

(A5) Where the operating speed $N_E$ of the engine 8 is held constant, the output shaft speed $N_{OUT}$ (second electric motor speed $N_{M2}$) rises with a rise of the first electric motor speed $N_{M1}$ in the Lo mode (first operation mode), as is apparent from the collinear chart of FIG. 3, but rises with a drop of the first electric motor speed $N_{M1}$ in the Hi mode (second operation mode), as is apparent from the collinear chart of FIG. 4. Namely, the direction of change of the output shaft speed $N_{OUT}$ due to a change of the first electric motor speed $N_{M1}$ after the switching of the drive system 10 between the Lo and Hi modes is reversed with respect to that before the switching. In the present embodiment, however, the synchronous mode switching control is implemented such that the direction of the output torque of the first electric motor M1 after the switching of the drive system 10 between the Lo and Hi modes is reversed with respect to that before the switching, so that the shock generated upon switching of the drive system 10 between the Lo and Hi modes can be effectively reduced.

(A6) The first rotary element $RE1_A$ is the sun gear S1 of the first planetary gear mechanism 24, and the second rotary element $RE2_A$ is the sun gear S2 of the second planetary gear mechanism 26. Further, the third rotary element $RE3_A$ connected to the engine 8 consists of the carrier C1 of the first planetary gear mechanism 24 and the ring gear R2 of the second planetary gear mechanism 26, which carrier C1 and ring gear R2 are fixed to each other, and the fourth rotary element $RE4_A$ connected to the drive wheels 38 and the second electric motor M2 consists of the ring gear R1 of the first planetary gear mechanism 24 and the carrier C2 of the second planetary gear mechanism 26, which ring gear R1 and carrier C2 are fixed to each other. The relationship between the speed ratio "i" and the power transmitting efficiency $\eta$ of the drive system 10 can be changed by selectively connecting the first electric motor M1 to one of the first and second rotary elements $RE1_A$, $RE2_A$ in the form of the sun gears S1, S2, the power transmitting efficiency $\eta$ of the drive system 10 can be held high enough to assure a high degree of fuel economy of the hybrid vehicle, over a wide range of the speed ratio of the drive system 10.

(A7) As indicated in FIG. 8, the operation mode control portion 54 selects the forward-drive Hi mode when the speed ratio "i" is lower than the value intermediate between $\{1/(1+\rho1)\}$ and $(1+\rho2)$, that is, when the vehicle speed V is relatively high, and selects the forward-drive Lo mode when the speed ratio "i" is higher than the value intermediate between $\{1/(1+\rho1)\}$ and $(1+\rho2)$, that is, when the vehicle speed V is relatively low. Accordingly, the power transmitting efficiency of the drive system 10 can be held high enough to assure a high degree of fuel economy of the hybrid vehicle, over a wide range of the speed ratio of the drive system 10.

Other embodiments of this invention will be described by reference to FIGS. 11-15. The same reference signs as used in the first embodiment will be used in the following embodiments to identify the corresponding elements.

Second Embodiment

Figures 11, 12:
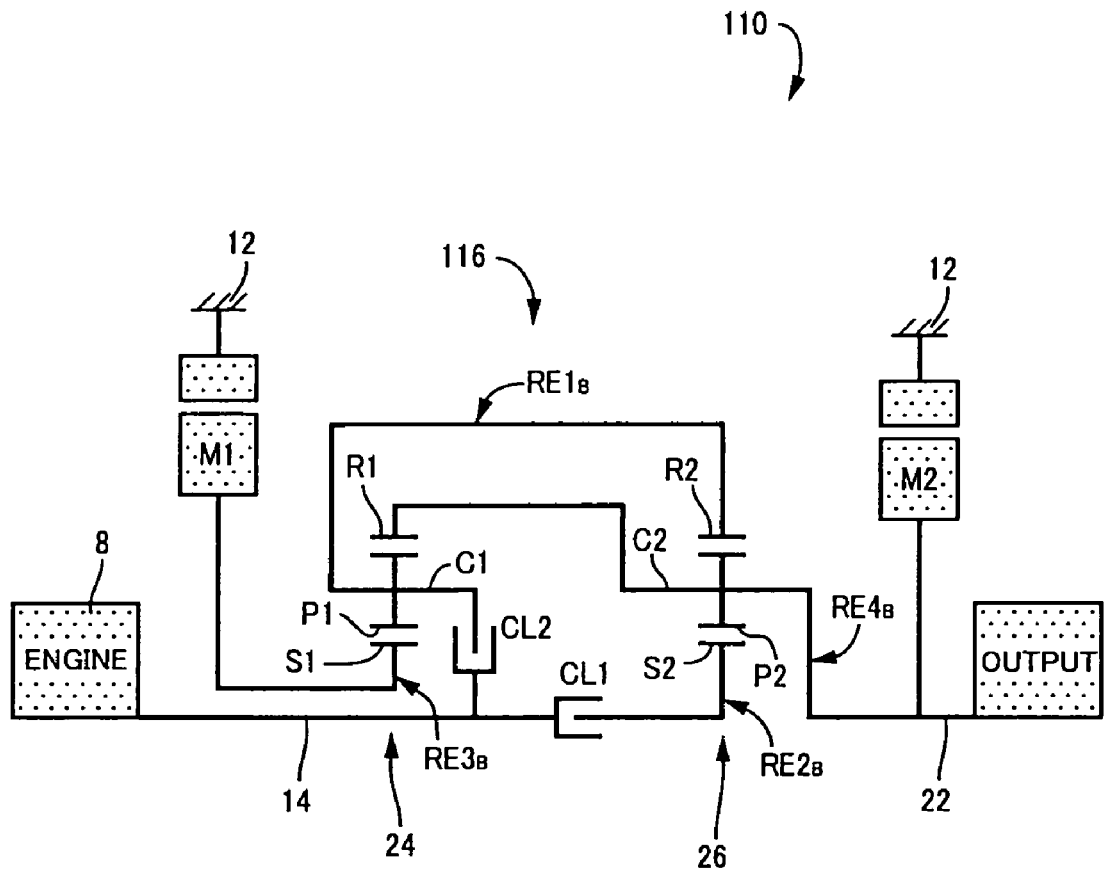
FIG. 11 is a schematic view corresponding to that of FIG. 1, showing an arrangement of a hybrid vehicle drive system constructed according to a second embodiment of this invention.
FIG. 12 is a table corresponding to that of FIG. 2, indicting the operation modes of the hybrid vehicle drive system of FIG. 11 in relation to the operating states of hydraulically operated frictional coupling devices incorporated in a power distributing mechanism of the drive system.

The schematic view of FIG. 11 shows an arrangement of a drive system 110 constructed according to the second embodiment of the invention. This drive system 110 is different from the drive system 10 only in that a power distributing mechanism 116 is provided in the drive system 110, in place of the power distributing mechanism 16 provided in the drive system 10.

As shown in FIG. 11, the drive system 110 includes the engine 8, input shaft 14 connected to the engine 8, a differential mechanism in the form of the above-indicated power distributing mechanism 116, and output shaft 22 connected to the power distributing mechanism 116. The engine 8, input shaft 14, power distributing mechanism 116 and output shaft 22 are coaxially disposed on the common axis within the stationary member in the form of the casing 12 attached to the body of the hybrid vehicle, and are connected in series with each other, as in the drive system 10 of the first embodiment shown in FIGS. 1 and 7. Like the drive system 10, the drive system 110 is configured to transmit a vehicle drive force to the pair of drive wheels 38 through the differential gear device 36 (final speed reduction gear) and a pair of drive axles, as shown in FIG. 7.

The power distributing mechanism 116 provided in the second embodiment is different from the power distributing mechanism 16 in the first embodiment, in the positions of the first and second clutches CL1, CL2, and in the mutual connections of the rotary elements of the first ands second planetary gear mechanisms 24, 26. In the other aspect, the power distributing mechanism 116 is identical with the power distributing mechanism 16. As in the first embodiment, the second electric motor M2 is connected directly to the power transmitting path between the drive wheels 38 and the power distributing mechanism 116.

In the power distributing mechanism 116, the first clutch CL1 is disposed between the second sun gear S2 and the engine 8 (input shaft 14), while the second clutch CL2 is disposed between the first carrier C1 and the engine 8 (input shaft 14). The first carrier C1 and the second ring gear R2, which are integrally fixed to each other, are selectively connected through the second clutch CL2 to the input shaft 14, that is, to the engine 8, and the second sun gear S2 is selectively connected through the first clutch CL1 to the engine 8. The first sun gear S1 is fixed to the first electric motor M1, and the first ring gear R1 and the second carrier C2 which are integrally fixed to each other are fixed to the output shaft 22, that is, to the drive wheel 38. When one of the first and second clutches CL1, CL2 is engaged while the other clutch is released, the power distributing mechanism 116 is placed in a continuously-variable shifting state in which the output of the engine 8 is distributed to the fist electric motor M1 and the output shaft 22, owing to the differential function of the first planetary gear mechanism 24 or second planetary gear mechanism 26, and a portion of the output of the engine 8 distributed to the first electric motor M1 is converted into an electric energy by the first electric motor M1 operated as the electric generator. The generated electric energy is stored in an electric-energy storage device (similar to the electric-energy storage device 78 shown in FIG. 7), or used to operate the second electric motor M2. The electric energy stored in the electric-energy storage device is used to operate the first or second electric motor M1, M2. In the continuously-variable shifting state, the rotating speed of the output shaft 22 is continuously variable irrespective of the operating speed of the engine 8. Namely, the power distributing mechanism 116 is placed in a differential state in which its speed ratio "i" (rotating speed $N_{IN}$ of the input shaft 14/rotating speed $N_{OUT}$ of the output shaft 22) is continuously changed from a minimum value $i_{min}$ to a maximum value $i_{max}$ that is, in the differential state or continuously-variable shifting state in which the power distributing mechanism 116 functions as an electrically controlled continuously-variable transmission the speed ratio "i" of which is continuously variable from the minimum value $i_{min}$ to the maximum value $i_{max}$.

The drive system 110 constructed as described above is placed in a selected one of the forward-drive Lo mode suitable for low-speed running of the vehicle, forward-drive Hi mode suitable for high-speed running of the vehicle, reverse-drive Lo mode, reverse-drive Hi mode, and neutral (N) mode, as indicated in the table of FIG. 12. The forward-drive Lo mode is established by concurrently engaging and releasing the first and second clutches CL1, CL2, respectively, and the forward-drive Hi mode is established by concurrently releasing and engaging the first and second clutches CL1, CL2, respectively. The reverse-drive Lo mode is established by concurrently engaging and releasing the first and second clutches CL1, CL2, respectively, and the reverse-drive Hi mode is established by concurrently releasing and engaging the first and second clutches CL1, CL2, respectively. The neutral (N) mode is established by releasing both of the first and second clutches CL1, CL2.

Figure 13:
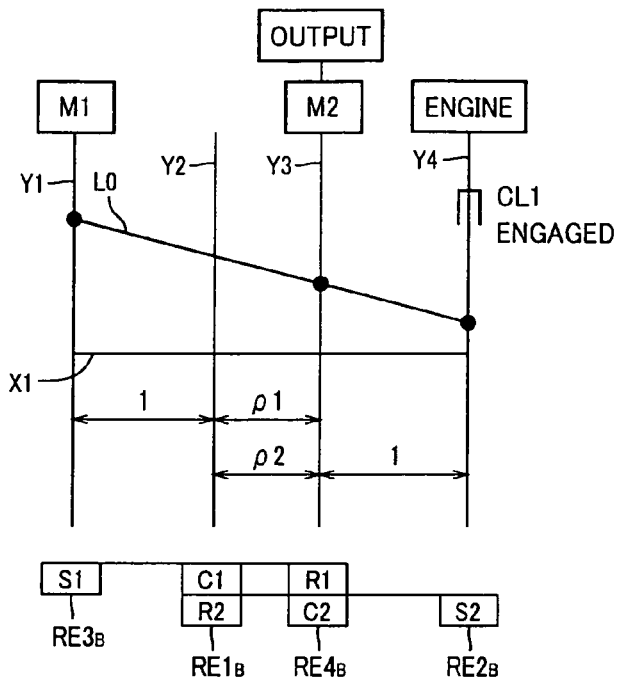
FIG. 13 is a collinear chart corresponding to that of FIG. 3, having four straight lines on which are indicated the relative rotating speeds of the four rotary elements of the power distributing mechanism, when the hybrid vehicle drive system of FIG. 11 is placed in the Lo mode (first operation mode)
Figure 14:
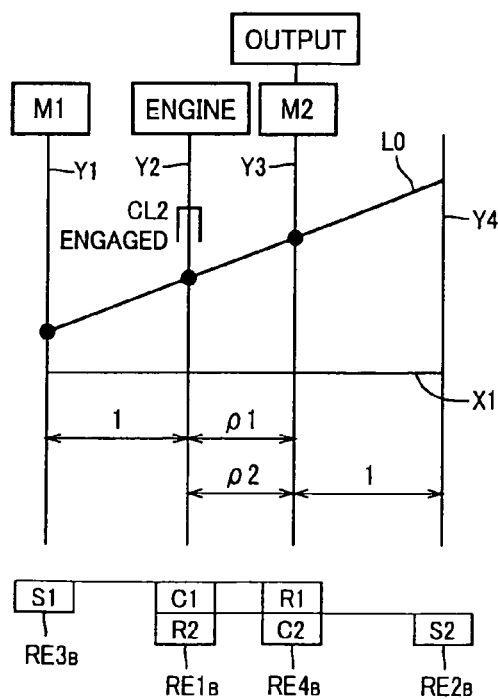
FIG. 14 is a collinear chart having four straight lines on which are indicated the relative the rotating speeds of the four rotary elements of the power distributing mechanism when the hybrid vehicle drive system of FIG. 11 is placed in the Hi mode (second operation mode)

The collinear chart of FIGS. 13 and 14 indicate, by straight lines, a relationship among the rotating speeds of the four rotary elements of the power distributing mechanism 116. Like the collinear charts of FIGS. 3 and 4, the collinear charts of FIGS. 13 and 14 are defined in the two-dimensional coordinate system in which the four rotary elements are located at respective four different positions along the base line or horizontal axis, and the gear ratios ρ of the first and second planetary gear mechanisms 24, 26 are taken along the horizontal axis, while the relative rotating speeds of the four rotary elements are taken along the vertical axis. The horizontal line X1 indicates the rotating speed of 0, while the four vertical lines Y1, Y2, Y3 and Y4 respectively represent the relative rotating speeds of a third rotary element (third element) $RE3_B$ in the form of the first sun gear S1, a first rotary element (first element) $RE1_B$ in the form of the first carrier C1 and second ring gear R2 fixed to each other, a fourth rotary element (fourth element) $RE4_B$ in the form of the first ring gear R1 and second carrier C2 fixed to each other, and a second rotary element (second element) $RE2_B$ in the form of the second sun gear S2. The distances between the adjacent ones of the vertical lines Y1, Y2, Y3 and Y4 are determined by the gear ratios ρ1, ρ2 of the first and second planetary gear mechanisms 24, 26. That is, the distance between the vertical lines Y1 and Y2 (between the first sun gear S1 and first carrier C1 of the first planetary gear mechanism 24), and the distance between the vertical lines Y3 and Y4 (between the second sun gear S2 and second carrier C2 of the second planetary gear mechanism 26) correspond to "1", while the distance between the vertical lines Y2 and Y3 (between the carrier C1, C2 and the ring gear R1, R2) corresponds to the gear ratios ρ1, ρ2.

Referring to the collinear charts of FIGS. 13 and 14, the drive system 110 is arranged such that the first rotary element $RE1_B$ (first carrier C1 and second ring gear R2) of the first and second planetary gear mechanisms 24, 26 is selectively connected to the engine 8 through the second clutch CL2, while the second rotary element $RE2_B$ (second sun gear S2) is selectively connected to the engine 8 through the first clutch CL1, and such that the third rotary element $RE3_B$ (first sun gear S1) is fixed to the first electric motor M1, while the fourth rotary element $RE4_B$ (first ring gear R1 and second carrier C2) is fixed to the output shaft 22 and the second electric motor M2, so that a rotary motion of the input shaft 14 is transmitted to the drive wheels 38 through the output shaft 22. In the collinear charts of FIGS. 13 and 14, the rotating speeds of the four rotary elements $RE1_B$, $RE2_B$, $RE3_B$ and $RE4_B$ of the power distributing mechanism 116 all lie on the inclined straight line L0, so that when these rotating speeds are different from each other, the rotating speeds decrease in the order of the third rotary element $RE3_B$, first rotary element $RE1_B$, fourth rotary element $RE4_B$ and second rotary element $RE2_B$, as seen in the collinear chart of FIG. 13, or increase in the same order, as seen in the collinear chart of FIG. 14.

The collinear chart of FIG. 13 indicates the operating state of the drive system 110 placed in a first operation mode in the form of the forward-drive Lo mode which is established in the engaged state of the first clutch CL1 and in the released state of the second clutch CL2 and in which the engine 8 is connected to the second rotary element $RE2_B$ through the first clutch CL1. In the collinear charts of FIGS. 13 and 14, the first rotary element $RE1_B$ is disposed on one side of the fourth rotary element $RE4_B$ connected to the drive wheels 38 and the second electric motor M2, and the second rotary element $RE2_B$ is disposed on the other side of the fourth rotary element $RE4_B$, while the third rotary element $RE3_B$ connected to the first electric motor M1 is disposed on one side of the first rotary element $RE1_B$ remote from the fourth rotary element $RE4_B$. In the collinear chart of FIG. 13 showing the state of the drive system 110 in the forward-drive Lo mode, the third rotary element $RE3_B$ and the second rotary element $RE2_B$ connected to the engine 8 through the first clutch CL1 are disposed on the respective opposite sides of the fourth rotary element RE4$_B$. In the forward-drive Lo mode (first operation mode), the rotating speed of the fourth rotary element RE4$_B$ is held within a range between an upper limit and a lower limit which are respectively equal to one and the other of the rotating speeds of the second rotary element RE2$_B$ and the third rotary element RE3$_B$, since the rotating speeds of the four rotary elements RE1$_B$-RE4$_B$ all lie on the inclined straight line L0. In other words, the fourth rotary element RE4$_B$ is rotated at a speed between the rotating speed of the second rotary element RE2$_B$ connected to the engine 8 through the engaged first clutch CL1, and the rotating speed of the third rotary element RE3$_B$. When the rotating speed of the first sun gear S1 represented by a point of intersection between the straight line L0 and the vertical line Y1 is continuously raised or lowered by controlling the output torque $T_{M1}$ of the first electric motor M1, the rotating speed of the second carrier C2 represented by a point of intersection between the straight line L0 and the vertical line Y3 is continuously raised or lowered. Thus, the rotary motion received from the engine 8 operating at a given speed is transmitted to the drive wheels 38 such that the rotating speeds of the drive wheels 38 are continuously variable. In this forward-drive Lo mode, the rotating speed $N_{OUT}$ of the output shaft 22 rises with a rise of the operating speed $N_{M1}$ of the first electric motor M1 while the engine speed $N_E$ is held constant.

The collinear chart of FIG. 14 indicates the operating state of the drive system 110 placed in a second operation mode in the form of the forward-drive Hi mode which is established in the released state of the first clutch CL1 and in the engaged state of the second clutch CL2 and in which the engine 8 is connected to the first rotary element RE1$_B$ through the second clutch CL2. In the collinear charts of FIG. 14, the third rotary element RE3$_B$ connected to the first electric motor M1 and the fourth rotary element RE4$_B$ connected to the drive wheels 38 and the second electric motor M2 are disposed on the respective opposite sides of the first rotary element RE1$_B$. In the collinear chart of FIG. 14 showing the state of the drive system 110 in the forward-drive Hi mode (second operation mode), the rotating speed of the first rotary element RE1$_B$ is held within a range between an upper limit and a lower limit which are respectively equal to one and the other of the rotating speeds of the third rotary element RE3$_B$ and the fourth rotary element RE4$_B$, since the rotating speeds of the four rotary elements RE1$_B$-RE4$_B$ all lie on the inclined straight line L0. In other words, the first rotary element RE connected to the engine through the second clutch CL2 is rotated at a speed between the rotating speed of the third rotary element RE3$_B$ and the rotating speed of the fourth rotary element RE4$_B$. When the rotating speed of the first sun gear S1 represented by a point of intersection between the straight line L0 and the vertical line Y1 is continuously raised or lowered by controlling the first electric motor output torque $T_{M1}$, the rotating speed of the first ring gear R1 represented by a point of intersection between the straight line L0 and the vertical line Y3 is continuously raised or lowered. Thus, the rotary motion received from the engine 8 operating at a given speed is transmitted to the drive wheels 38 such that the rotating speeds of the drive wheels 38 are continuously variable. In this forward-drive Hi mode in which the first clutch CL1 is placed in the released state, the second sun gear S2 is freely rotatable, so that the rotary motion of the input shaft 14 is transmitted to the output shaft 22 primarily through the first planetary gear mechanism 24. In the forward-drive Hi mode, the rotating speed of the output shaft 22 increases with a decrease of the operating speed $N_{M1}$ of the first electric motor M1 while the engine speed $N_E$ is held constant.

As described above, the drive system 110 is arranged such that the operating states of the first and second clutches CL1, CL2 are controlled under the control of the hybrid control portion 52 (shown in FIG. 7), to connect the engine 8 selectively to the first rotary element RE1$_B$ or the second rotary element RE2$_B$, for placing the drive system 110 in a selected one of the forward-drive Lo mode or Hi mode.

Like the drive system 10, the drive system 110 is controlled by the hybrid control portion 52, mode-switching-condition determining portion 56 and vehicle-condition determining portion 58. The hybrid control portion 52 includes an operation mode control portion 154 (shown in FIG. 7) in place of the operation mode control portion 54. The operation mode control portion 154 is identical in operation with the operation mode control portion 54, except in that the operation mode control portion 154 is configured to implement a synchronous mode switching control so as to minimize a difference between the values of the engine speed $N_E$ before and after switching of the drive system 110 between the Lo and Hi modes. In the drive system 10 according to the first embodiment shown in FIG. 1, the first electric motor M1 is connected to a selected one of the first and second rotary elements RE1$_A$, RE2$_A$. In the drive system 110 according to the second embodiment, however, the engine 8 is connected to a selected one of the first and second rotary elements RE1$_B$, RE2$_B$.

The minimization of the difference between the values of the engine speed $N_E$ before and after the switching of the operation mode between the Lo and Hi modes is equivalent to minimization of an angle of the straight line L0 with respect to the horizontal line X1 in the collinear charts of FIGS. 13 and 14, that is, establishment of the parallelism of the straight line L0 with the horizontal line X1. In other words, the minimization of the above-indicated engine speed difference means minimization of a difference between the first electric motor speed $N_{M1}$ represented by a point of intersection between the straight line L0 and the vertical line Y1 and the second electric motor speed $N_{M2}$ represented by a point of intersection between the straight line L0 and the vertical line Y3. Accordingly, the synchronous mode switching control by the operation mode control portion 154 is identical with that in the first embodiment, and is implemented according to the control routine described above by reference to the flow chart of FIG. 9.

The drive system 110 constructed according to the present second embodiment of the invention has the following advantages (B1)-(B5), in addition to the advantages (A2) and (A5) described above with respect to the first embodiment:

(B1) As in the drive system 10 of FIG. 1, the four rotary elements RE1$_B$, RE2$_B$, RE3$_B$ and RE4$_B$ of the power distributing mechanism 116 in the drive system 110 are arranged to permit the drive system 110 to be placed in the selected one of the first operation mode in the form of the forward-drive Lo mode and the second operation mode in the form of the forward-drive Hi mode. In the first operation mode, the third rotary element RE3$_B$ connected to the first electric motor M1 and the second rotary element RE2$_B$ connected to the engine 8 through the first clutch CL1 are disposed on the respective opposite sides of the fourth rotary element RE4$_B$ connected to the drive wheels 38 and the second electric motor M2, as seen in the collinear chart of FIG. 13 in which the four rotary elements RE1$_B$, RE2$_{AB}$ RE3$_{AB}$ and RE4$_B$ are located at the respective four different positions along the base line of the collinear chart. In the second operation mode, the third rotary element RE3$_B$ and the fourth rotary element RE4$_B$ are disposed on the respective opposite sides of the first rotary element RE1$_B$, as seen in the collinear chart of FIG. 14. Stated differently, the drive system 110 is constructed to be selectively placed in the Lo mode (first operation mode) in which the fourth rotary element RE4$_B$ connected to the drive wheels 38 and the second electric motor M2 is rotated at a speed intermediate between the rotating speed of the second rotary element RE2$_B$ connected to the engine 8 through the first clutch CL1 and the rotating speed of the third rotary element RE3$_B$ connected to the first electric motor M1, or in the Hi mode (second operation mode) in which the first rotary element RE1$_B$ is rotated at a speed intermediate between the rotating speed of the third rotary element RE3$_B$ and the rotating speed of the fourth rotary element RE4$_B$. Therefore, the relative rotating speeds of the engine 8, first electric motor M1 and drive wheels 38 in the Lo mode are different from those in the Hi mode, so that the relationship between the speed ratio "i" and power transmitting efficiency η of the drive system 110 in the Lo mode is different from that in the Hi mode. Accordingly, the power transmitting efficiency η of the drive system 110 can be held high enough to assure a high degree of fuel economy of the hybrid vehicle, over a wide range of the overall speed ratio "i" of the drive system 110, by suitably switching the drive system 110 between its Lo and Hi modes. In both of the Lo and Hi modes, the second electric motor M2 is connected to the fourth rotary element RE4$_B$. Namely, the rotary element to which the second electric motor M2 and the drive wheels 38 are connected is not changed when the operation mode of the drive system 110 is changed, so that the drive system 110 can be smoothly switched between the Lo and Hi modes.

(B2) The first rotary element RE1$_B$ and the second rotary element RE2$_B$ are disposed on the respective opposite sides of the fourth rotary element RE4$_B$ connected to the drive wheels 38 and the second electric motor M2, as seen in the collinear charts of FIGS. 13 and 14, and the rotary third element RE3$_B$ connected to the first electric motor M1 is disposed on one side of the first rotary element RE1$_B$ remote from the fourth rotary element RE4$_B$ connected to the drive wheels 38 and the second electric motor M2, as seen in the collinear charts. The engine 8 is connected to a selected one of the first and second rotary elements RE1$_B$ and RE2$_B$, to place the drive system 110 in the selected one of the forward-drive Low mode (first operation mode) and the forward-drive mode (second operation mode). Stated differently, the power distributing mechanism 116 includes the first and second rotary elements RE1$_B$, RE2$_B$ connectable to the engine 8, the third rotary element RE3$_B$ connected to the first electric motor M1, and the fourth rotary element RE4$_B$ connected to the drive wheels 38 and the second electric motor M2, and when the first, second, third and fourth rotary elements RE1$_B$, RE2$_B$, RE3$_B$, RE4$_B$ have respective different rotating speeds, these different rotating speeds decrease in the order of the third, first, fourth and second rotary elements, or in the reverse order. The engine 8 is connected to the second rotary element RE2$_B$ to establish the Low mode (first operation mode), and to the first rotary element RE1$_B$ to establish the Hi mode (second operation mode). Thus, the operation mode is changed by connecting the engine 8 selectively to one of the first and second rotary elements RE1$_B$, RE2$_B$, and the power transmitting efficiency η of the drive system 110 can be held high enough to assure a high degree of fuel economy of the hybrid vehicle, over a wide range of the speed ratio "i" of the drive system 110.

(B3) The present drive system 110 is switched between the forward-drive Lo and Hi modes (first and second operation modes) under the synchronous mode switching control implemented by the operation mode control portion 154, so as to minimize the difference between the values of the operating speed $N_E$ of the engine 8 before and after switching of the drive system 110 between the two forward-drive Lo and Hi modes, by controlling the engine speed $N_E$, first electric motor speed $N_{M1}$ and hydraulic pressures of the first and second clutches CL1, CL2. Accordingly, a shock generated upon switching of the drive system 110 between the Lo and Hi modes can be effectively reduced.

(B4) Like the drive system 10, the present drive system 110 is arranged such that where the operating speed $N_E$ of the engine 8 is held constant, the output shaft speed $N_{OUT}$ (second electric motor speed $N_{M2}$) rises with a rise of the first electric motor speed $N_{M1}$ in the Lo mode (first operation mode), as is apparent from the collinear chart of FIG. 13, but rises with a drop of the first electric motor speed $N_{M1}$ in the Hi mode (second operation mode), as is apparent from the collinear chart of FIG. 14. Namely, the direction of change of the output shaft speed $N_{OUT}$ due to a change of the first electric motor speed $N_{M1}$ after the switching of the drive system 110 between the Lo and Hi modes is reversed with respect to that before the switching. In the present embodiment, however, the synchronous mode switching control is implemented such that the direction of the output torque of the first electric motor M1 after the switching of the drive system 110 between the Lo and Hi modes is reversed with respect to that before the switching, so that the shock generated upon switching of the drive system 110 between the Lo and Hi modes can be effectively reduced.

(B5) The first rotary element RE1$_B$ consists of the carrier C1 of the first planetary gear mechanism 24 and the ring gear R2 of the second planetary gear mechanism 26, which carrier and ring gear C1, R2 are fixed to each other, and the second rotary element RE2$_B$ is the sun gear S2 of the second planetary gear mechanism 26. Further, the third rotary element RE3$_B$ connected to the first electric motor M1 is the sun gear S1 of the first planetary gear mechanism 24, and the fourth rotary element RE4$_B$ connected to the drive wheels 38 and the second electric motor M2 consists of the ring gear R1 of the first planetary gear mechanism 24 and the carrier C2 of the second planetary gear mechanism 26, which ring gear and carrier R1, C2 are fixed to each other. The relationship between the speed ratio "i" and the power transmitting efficiency η of the drive system 110 can be changed by selectively connecting the engine 8 to one of the first and second rotary elements RE1$_B$, RE2$_B$, the power transmitting efficiency of the drive system 110 can be held high enough to assure a high degree of fuel economy of the hybrid vehicle, over a wide range of the speed ratio "i" of the drive system 110.

Third Embodiment

Figure 15:
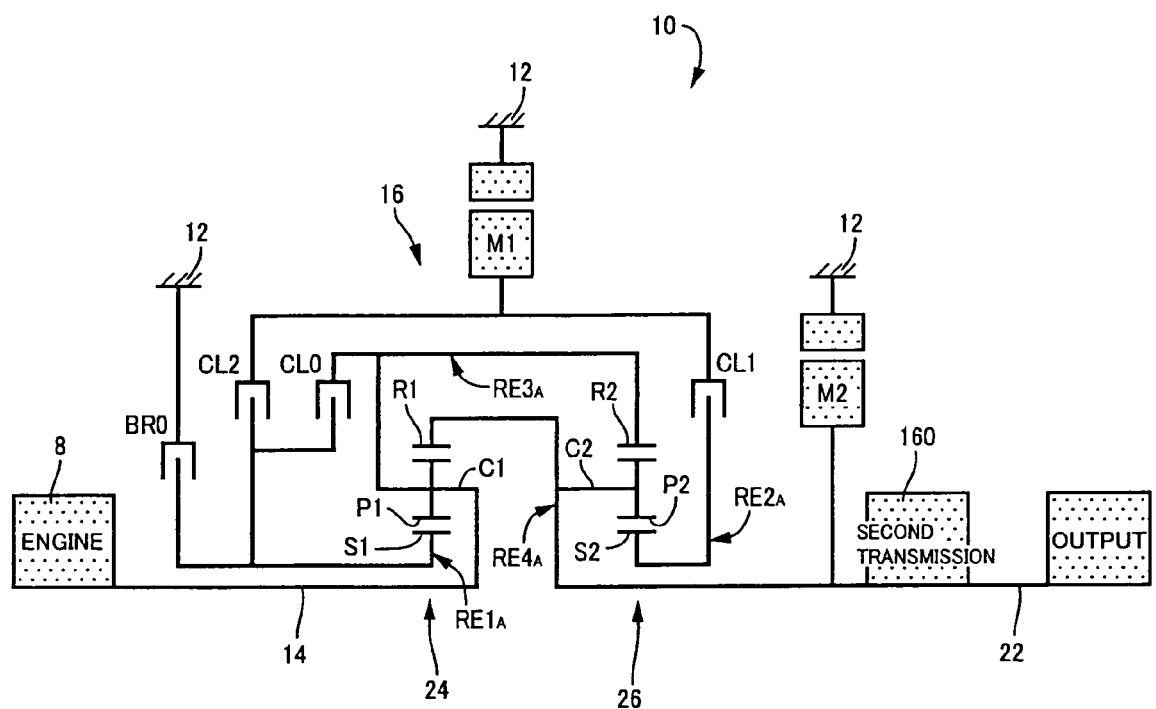
FIG. 15 is a schematic view showing an arrangement of a hybrid vehicle drive system which is constructed according to a third embodiment of this invention and which is provided with a second transmission and a differential limiting device in the form of a clutch and a brake.

In the drive systems 10, 110 according to the first and second embodiments, the power transmitting path between the engine 8 and the drive wheels 38 is provided with the power distributing mechanism 16, 116. However, a drive system according to the principle of this invention may be provided with a first transmission in the form of the power distributing mechanism 16, 116, and a second transmission 160 which is disposed in a power transmitting path between the engine 8 or drive wheels and the power distributing mechanism 16, 116 and the speed ratio of which is variable. FIG. 15 shows an example of such a drive system in the form of the drive system 10 of the first embodiment as modified according to the third embodiment, such that the drive system 10 is modified to be provided with the second transmission 160 disposed between the power distributing mechanism 16 and the drive wheels 38. The drive system 10 according to the third embodiment has power transmitting efficiency η high enough to assure a high degree of fuel economy of the hybrid vehicle, over a wider range of the speed ratio "i", than the drive system 10 of the first embodiment not provided with the second transmission 160. The first transmission in the form of the power distributing mechanism 16, 116 and the second transmission 160 may be connected in series with each other, as in the third embodiment of FIG. 15, but need not be mechanically independent of each other, provided the drive system 10, 110 includes the first transmission in the form of the power distributing mechanism 16, 116 having an electrically controlled differential portion operable to perform an electric differential function, and the second transmission 160 operable to change its speed ratio according to a principle different from that of the electrically controlled differential portion.

In the preceding embodiments, the differential state of the power distributing mechanism 16, 116 is controlled by controlling the operating state of the first electric motor M1. However, the differential state of the power distributing mechanism 16, 116 may be controlled by controlling a differential-limiting device such as a clutch or a brake, which is provided in addition to the first and second clutches CL1, CL2 and which is operable to connect or fix one of the rotary elements of the power distributing mechanism 16, 116 to the other rotary element, or to fix a selected one of the rotary elements to the stationary member in the form of the casing 12, for example. In the drive system 10 according to the third embodiment of FIG. 15, a clutch CL0 is provided as the differential-limiting device, such that the first rotary element $RE1_A$ is connected or fixed to the third rotary element $RE3_A$ when the clutch CL0 is engaged. In the engaged state of the clutch CL0, the power distributing mechanism 16, 116 is placed in a non-differential state in which the four rotary elements are rotated as a unit and the speed ratio is held constant at "1". The drive system 10 of FIG. 15 is further provided with another differential-limiting device in the form of a brake BR0. When the brake BR0 is engaged while the first and second clutches CL1, CL2 are both in the released state, the first sun gear S1 is fixed to the casing 12 and is thus held stationary, so that the power distributing mechanism 16 functions as a transmission operable to raise the engine speed $N_E$ at a given speed ratio "i". If the drive system 110 of FIG. 11 is provided with the brake BR0, the first sun gear S1 is fixed to the casing 12 and held stationary when the brake BR0 is engaged in the released state of the first clutch CL1 and in the engaged state of the second clutch CL2. In this case, too, the power distributing mechanism 116 functions as a transmission operable to raise the engine speed $N_E$ at a given speed ratio "i". Where the drive system is provided with a differential-limiting device such as the clutch CL0 or brake BR0, the differential-limiting device permits the output of the engine 8 to be transmitted to the drive wheels 38, without the power distributing mechanism 16, 116 distributing the engine output to the first electric motor M1 as well as to the drive wheels 38. The fuel economy of the hybrid vehicle can be improved when the differential function of the power distributing mechanism 16, 116 is disabled by the differential-limiting device, under some running condition of the vehicle in which the fuel economy is improved by inhibiting a supply of the electric path through the electric path. For instance, the fuel economy can be improved by disabling the power distributing mechanism 16, 116 when the vehicle is running at a high speed V higher than an upper limit V1, or when the temperature of the first or second electric motor M1, M2 is higher than an upper limit. Although the third embodiment of FIG. 15, is provided with the differential-limiting device in the form of clutch CL0 in addition to the first and second clutches CL1, CL2, the first and second clutches CL1, CL2 may function as the differential-limiting device when both of these two clutches CL1, CL2 are concurrently engaged.

While the preferred embodiments of this invention have been described in detail by reference to the accompanying drawings, for illustrative purpose only, it is to be understood that the present invention may be embodied with various changes and modifications which may occur to those skilled in the art.

In the illustrated embodiments, the power distributing mechanism 16, 116 is operable as an electrically controlled continuously-variable transmission the speed ratio "i" of which is variable from the minimum value $i_{min}$ to the maximum value $i_{max}$, by controlling the operating state of the first electric motor M1. However, the speed ratio "i" of the power distributing mechanism 16, 116 may be variable in steps by utilizing its differential function.

While the engine 8 and the power distributing mechanism 16 are connected directly to each other in the illustrated drive system 10 according to the first embodiment, the engine 8 and the power distributing mechanism 16 may be connected to each other through a clutch or any other coupling device.

In the illustrated drive system 110 according to the second embodiment, the first electric motor M1 and the power distributing mechanism 116 are connected directly to each other. However, the first electric motor M1 may be connected to the power distributing mechanism 116 through a clutch or any other coupling device.

In the illustrated drive systems 10, 110, the second electric motor M2 and the output shaft 22 are connected directly to each other. However, the second electric motor M2 and the output shaft 22 may be connected to each other through a clutch or any other coupling device.

While the engine 8 and the input shaft 14 are connected directly to each other in the illustrated embodiments, the engine 8 and the input shaft 14 may be operatively connected to each other through gears or a belt, and need not be disposed coaxially with each other.

While the first electric motor M1 and the second electric motor M2 are disposed coaxially with the input shaft 14 in the illustrated embodiments, the electric motors M1, M2 need not be disposed coaxially with the input shaft 14, and the first electric motor M1 may be operatively connected to a selected one of the rotary elements of the power distributing mechanism 16, 116 through gars, a belt or a speed reducing device, while the second electric motor M2 may be operatively connected to the output shaft 22 through such gears belt and speed reducing device.

While each of the first and second planetary gear sets 24, 26 in the illustrated embodiments is of the single-pinion type, it may be of a double-pinion type.

In the illustrated embodiments, the second electric motor M2 is directly connected to the output shaft 22. However, the second electric motor M2 may be connected, either directly or indirectly via a transmission, a planetary gear set or coupling device to any portion of the power transmitting path between the engine 8 or output shaft 22 (power distributing mechanism 16) and the drive wheels 38.

In the illustrated embodiments, the second electric motor M2 is connected to the output shaft 22 which constitutes a part of the power transmitting path between the engine 8 and the drive wheels 38. However, the second electric motor M2 may be connected to the power distributing mechanism 16, 116 through a clutch or any other coupling device, as well as to the output shaft 22. Further, the drive system 10, 110 may be configured such that the power distributing mechanism 16, 116 is operable to perform the differential function when the operating state of the second electric motor M2 rather than the first electric motor M1 is controlled.

In the illustrated embodiments, the first and second clutches CL1, CL2 are hydraulically operated frictional coupling devices. However, these clutches CL1, CL2 may be magnetic power clutches, electromagnetic clutches, dog clutches of meshing type, or any other mechanical type clutches.

What is claimed is:

1. A drive system of a hybrid vehicle, including an engine, a first electric motor, a second electric motor operatively connected to a drive wheel of the hybrid vehicle, and two planetary gear mechanisms,
   wherein said two planetary gear mechanisms have at least four rotary elements arranged to permit the drive system to be placed in a selected one of a first operation mode in which a rotary element of the four rotary elements, connected to said drive wheel and said second electric motor is rotated at a speed intermediate between a rotating speed of a rotary element of the four rotary elements, connected to said engine and a rotating speed of a rotary element of the four rotary elements, connected to said first electric motor, and a second operation mode in which the rotary element of the four rotary elements, connected to said engine is rotated at a speed intermediate between the rotating speed of the rotary element of the four rotary elements, connected to said first electric motor and a rotating speed of the rotary element of the four rotary elements, connected to said drive wheel and said second electric motor.

2. The drive system according to claim 1, wherein said second electric motor is connected directly to a power transmitting path between said drive wheel and said two planetary gear mechanisms.

3. The drive system according to claim 1, wherein the four rotary elements include first and second rotary elements connectable to said first electric motor, a third rotary element connected to said engine, and a fourth rotary element connected to said drive wheel and said second electric motor,
   wherein when said first, second, third and fourth rotary elements have respective different rotating speeds, said different rotating speeds decrease in the order of the first, third, fourth and second rotary elements, or in the reverse order, and
   wherein said first electric motor is connected to a selected one of said first and second rotary elements, to place the drive system in the selected one of said first and second operation modes.

4. The drive system according to claim 3, wherein said first electric motor is connected to the second rotary element to establish said first operation mode, and to the first rotary element to establish said second operation mode.

5. The drive system according to claim 3, which is switched between said first and second operation modes under a synchronous mode switching control implemented so as to minimize a difference between operating speeds of said first electric motor before and after switching of the drive system between the first and second operation modes.

6. The drive system according to claim 4, wherein said synchronous mode switching control is implemented such that a direction of an output torque of said first electric motor after the switching of the drive system between the first and second operation modes is reversed with respect to that before said switching.

7. The drive system according to claim 3, wherein said first rotary element is a sun gear of one of said two planetary gear mechanisms, and said second rotary element is a sun gear of the other of the two planetary gear mechanisms, the third rotary element consisting of a carrier of said one planetary gear mechanism and a ring gear of said other planetary gear mechanism, which carrier and ring gear are fixed to each other, and the fourth rotary element consisting of a ring gear of said one planetary gear mechanism and a carrier of said other planetary gear mechanism, which ring gear and carrier are fixed to each other.

8. The drive system according to claim 1, wherein the four rotary elements include first and second rotary elements connectable to said engine, a third rotary element connected to said first electric motor, and a fourth rotary element connected to said drive wheel and said second electric motor,
   wherein when said first, second, third and fourth rotary elements have respective different rotating speeds, said different rotating speeds decrease in the order of the third, first, fourth and second rotary elements, or in the reverse order, and
   wherein said engine is connected to a selected one of said first and second rotary elements, to place the drive system in the selected one of said first and second operation modes.

9. The drive system according to claim 8, wherein said engine is connected to the second rotary element to establish said first operation mode, and to the first rotary element to establish said second operation mode.

10. The drive system according to claim 8, which is switched between said first and second operation modes under a synchronous mode switching control implemented so as to minimize a difference between operating speeds of said engine before and after switching of the drive system between the first and second operation modes.

11. The drive system according to claim 8, wherein said first rotary element consists of a carrier of one of said two planetary gear mechanisms and a ring gear of the other of the two planetary gear mechanisms, which carrier and ring gear are fixed to each other, and said second rotary element is a sun gear of the other of the two planetary gear mechanisms, the third rotary element being a sun gear of said one planetary gear mechanism, and the fourth rotary element consisting of a ring gear of said one planetary gear mechanism and a carrier of said other planetary gear mechanism, which ring gear and carrier are fixed to each other.

12. The drive system according to claim 1, further including a transmission disposed between said drive wheel and said two planetary-gear mechanisms.

13. The drive system according to claim 1, further comprising a differential-limiting device operable to fix one of the rotary elements of said two planetary gear mechanisms to another of said rotary elements or a stationary member.

* * * * *